(12) United States Patent
Filippov et al.

(10) Patent No.: US 10,798,390 B2
(45) Date of Patent: *Oct. 6, 2020

(54) METHOD AND APPARATUS FOR SCAN ORDER SELECTION

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

This patent is subject to a terminal disclaimer.

(21) Appl. No.: 16/100,984

(22) Filed: Aug. 10, 2018

(65) Prior Publication Data
US 2019/0020881 A1 Jan. 17, 2019

Related U.S. Application Data

(63) Continuation of application No. PCT/RU2016/000068, filed on Feb. 12, 2016.

(51) Int. Cl.
*H04N 19/176* (2014.01)
*H04N 19/18* (2014.01)
(Continued)

(52) U.S. Cl.
CPC ......... *H04N 19/176* (2014.11); *H04N 19/129* (2014.11); *H04N 19/136* (2014.11);
(Continued)

(58) Field of Classification Search
None
See application file for complete search history.

(56) References Cited

U.S. PATENT DOCUMENTS

| 5,500,678 A | 3/1996 | Puri |
| 5,602,549 A | 2/1997 | Jeong |

(Continued)

FOREIGN PATENT DOCUMENTS

| CN | 101682771 A | 3/2010 |
| CN | 102651816 A | 8/2012 |

(Continued)

OTHER PUBLICATIONS

Sole et al, "Transform Coefficient Coding in HEVC," IEEE Transactions on Circuits and Systems for Video Technology, vol. 22, No. 12, pp. 1765-1777, Institute of Electrical and Electronics Engineers, New York, New York (Dec. 2012).

(Continued)

*Primary Examiner* — Xiaolan Xu
(74) *Attorney, Agent, or Firm* — Leydig, Voit & Mayer, Ltd.

(57) ABSTRACT

The disclosure proposes a decoder for decoding coefficients of blocks of a video sequence from a bitstream. The decoder comprises a decoding module configured to decode one or more coefficient vectors of each block from the bitstream, a check module configured to reconstruct, for at least one block, hidden information from one or more coefficients of that block, the hidden information constituting or forming part of scan order information associated with that block, a scan order selector configured to select a scan order for each block from a set of scan orders, preferably from a set of pre-defined and generated scan orders, on the basis of the scan order information associated with that block, and a deserializer configured to inverse scan, for each block, the one or more coefficient vectors of that block according to the scan order selected for that block so as to obtain a coefficient matrix.

37 Claims, 8 Drawing Sheets

(51) Int. Cl.
*H04N 19/136* (2014.01)
*H04N 19/129* (2014.01)
*H04N 19/70* (2014.01)
*H04N 19/159* (2014.01)
*H04N 19/44* (2014.01)

(52) U.S. Cl.
CPC .......... *H04N 19/159* (2014.11); *H04N 19/18* (2014.11); *H04N 19/44* (2014.11); *H04N 19/70* (2014.11)

(56) References Cited

U.S. PATENT DOCUMENTS

| | | |
|---|---|---|
| 6,148,109 A | 11/2000 | Boon et al. |
| 8,477,845 B2 | 7/2013 | Liu et al. |
| 8,488,668 B2 | 7/2013 | Ye et al. |
| 8,929,440 B2 | 1/2015 | Nguyen et al. |
| 9,124,872 B2 | 9/2015 | Sole Rojals et al. |
| 9,197,890 B2 | 11/2015 | Sole Rojals et al. |
| 2008/0310745 A1 | 12/2008 | Ye et al. |
| 2011/0206135 A1 | 8/2011 | Drugeon et al. |
| 2011/0243220 A1 | 10/2011 | Seregin et al. |
| 2011/0249726 A1 | 10/2011 | Nguyen et al. |
| 2012/0099646 A1* | 4/2012 | Coban .................. H04N 19/176 375/240.12 |
| 2012/0195373 A1 | 8/2012 | Sroka Chalot |
| 2012/0230420 A1 | 9/2012 | Sole Rojals et al. |
| 2013/0051459 A1 | 2/2013 | Kirchhoffer et al. |
| 2013/0051475 A1* | 2/2013 | Joshi .................... H04N 19/159 375/240.18 |
| 2013/0058407 A1 | 3/2013 | Sole Rojals et al. |
| 2013/0188710 A1 | 7/2013 | Xu et al. |
| 2013/0235936 A1 | 9/2013 | Campbell et al. |
| 2013/0272423 A1 | 10/2013 | Chien et al. |
| 2013/0272424 A1* | 10/2013 | Sole Rojals ......... H04N 19/129 375/240.18 |
| 2013/0336409 A1 | 12/2013 | He et al. |
| 2014/0314143 A1 | 10/2014 | Lee et al. |
| 2015/0146775 A1 | 5/2015 | Lee et al. |
| 2015/0172652 A1 | 6/2015 | Gamei et al. |
| 2018/0070090 A1 | 3/2018 | Lee et al. |
| 2019/0020881 A1 | 1/2019 | Filippov et al. |
| 2019/0098323 A1 | 3/2019 | Kirchhoffer et al. |

FOREIGN PATENT DOCUMENTS

| | | |
|---|---|---|
| CN | 102939755 A | 2/2013 |
| CN | 103181170 A | 6/2013 |
| CN | 103270754 A | 8/2013 |
| CN | 103493488 A | 1/2014 |
| CN | 103703776 A | 4/2014 |
| CN | 105187829 A | 12/2015 |
| EP | 0851391 A2 | 7/1998 |
| EP | 2637409 A1 | 9/2013 |
| EP | 2675159 A1 | 12/2013 |
| EP | 1679903 B1 | 10/2014 |
| EP | 2866443 A1 | 4/2015 |
| EP | 2618572 B1 | 8/2016 |
| JP | H0856358 A | 2/1996 |
| JP | H09261078 A | 10/1997 |
| JP | 2013524707 A | 6/2013 |
| JP | 2013150323 A | 8/2013 |
| JP | 2013541917 A | 11/2013 |
| JP | 2019509671 A | 4/2019 |
| RU | 2562381 C1 | 9/2015 |
| RU | 2585976 C2 | 6/2016 |
| RU | 2604421 C2 | 12/2016 |
| WO | 2008157431 A2 | 12/2008 |
| WO | 2012054805 A1 | 4/2012 |
| WO | 2012074772 A1 | 6/2012 |
| WO | 2015152757 A1 | 10/2015 |

OTHER PUBLICATIONS

Lee et al, "Adaptive Scanning for H264/AVC Intra Coding," ETRI Journal, vol. 28, No. 5, pp. 668-671, (Oct. 2006).

Choi et al, "Adaptive Coefficient Scanning Based on the Intra Prediction Mode," ETRI Journal, vol. 29, No. 5, pp. 694-696, (Oct. 2007).

Yusuf et al, "A Novel Scanning Scheme for Directional Spatial Prediction of AVS Intra Coding," International Journal of Advanced Research in Electrical, Electronics and Instrumentation Engineering, vol. 2, Issue 8, pp. 4120-4126, (Aug. 2013).

Filippov et al., "Scalar-quantization-based Multi-layer Data Hiding for Video Coding Applications," 2014 IEEE, Institute of Electrical and Electronics Engineers, New York, New York (2014).

Clare et al, "Sign Data Hiding," Presentation, Orange Labs, JCTVC-G271-presentation_r1, (2011).

Clare et al, "Sign Data Hiding," Joint Collaborative Team on Video Coding (JCT-VC) of ITU-T SG16 WP3 and ISO/IEC JTC1/SC29/WG11, 7th Meeting: Geneva, CH, JCTVC-G271, m21833, JCTVC-G271, m21833, (Nov. 21-30, 2011).

Sullivan et al., "Overview of the High Efficiency Video Coding (HEVC) Standard," IEEE Transactions on Circuits and Systems for Video Technology, vol. 22, No. 12, Institute of Electrical and Electronics Engineers, New York, New York (Dec. 2012).

"Series H: Audiovisual and Multimedia Systems Infrastructure of audiovisual services—Coding of moving video High efficiency video coding," ITU-T H.265, International Telecommunications Union, Geneva, Switzerland, (Apr. 2015).

"Series H: Audiovisual and Multimedia Systems Infrastructure of audiovisual services—Coding of moving video Advanced video coding for generic audiovisual services," ITU-T H.264, International Telecommunications Union, Geneva, Switzerland, (Feb. 2016).

\* cited by examiner

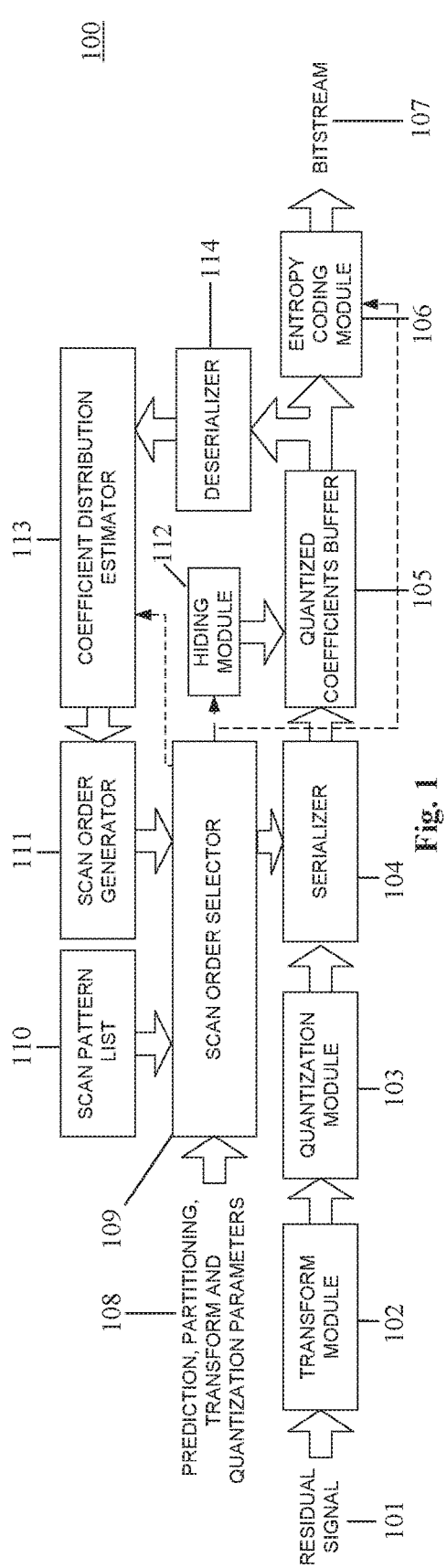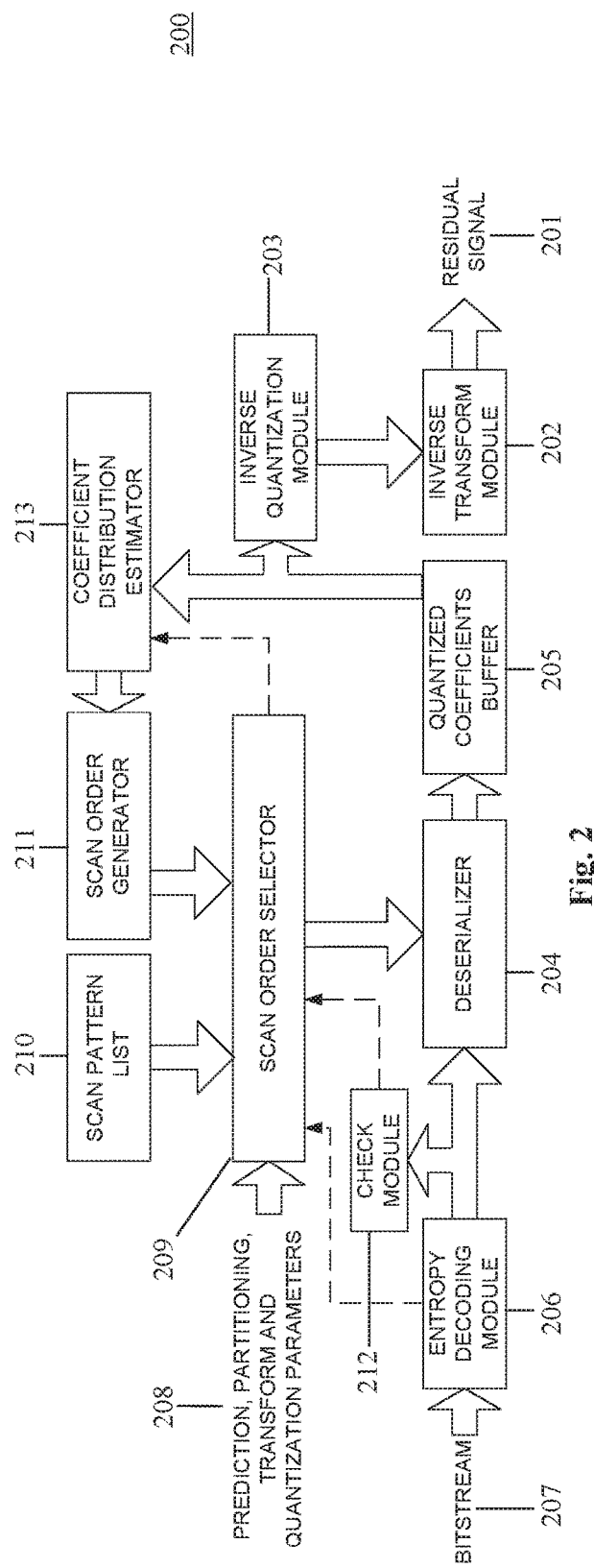

● — The first non-zero quantized transform coefficient of a Coefficient Group (CG)

● — The last non-zero quantized transform coefficient of a CG

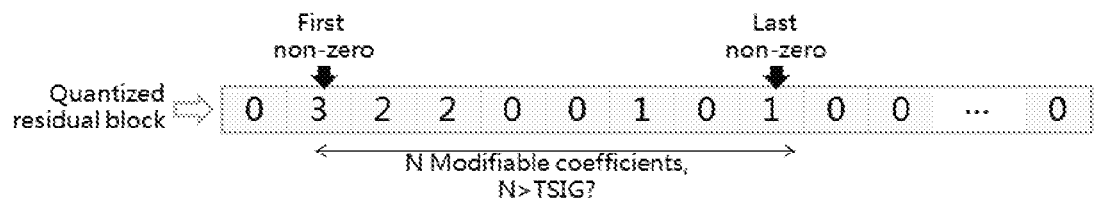
Fig. 8
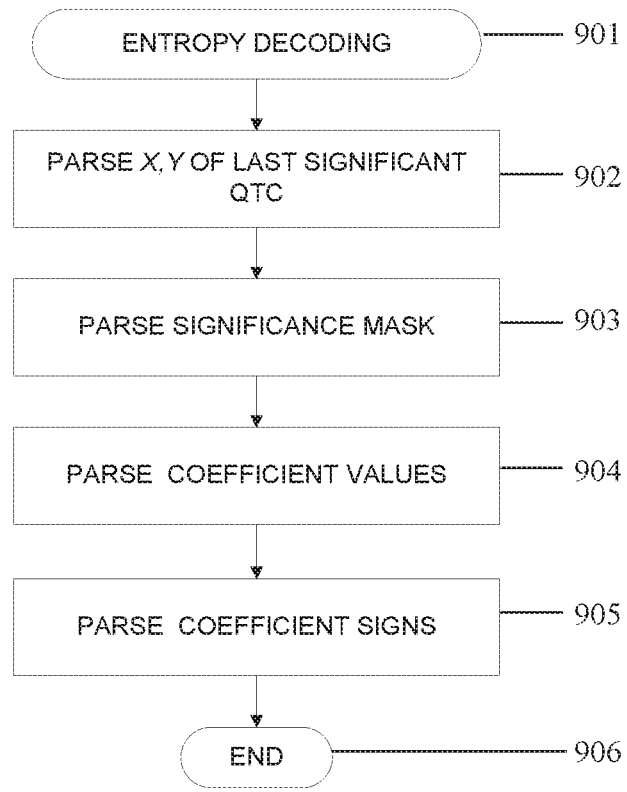
Fig. 9 (state of the art)

METHOD AND APPARATUS FOR SCAN ORDER SELECTION

CROSS-REFERENCE TO RELATED APPLICATIONS

This application is a continuation of International Application No. PCT/RU2016/000068, filed on Feb. 12, 2016, the disclosure of which is hereby incorporated by reference in its entirety.

TECHNICAL FIELD

The present disclosure generally relates to the field of video processing and to a method and apparatus for scan order selection, in particular content-adaptive scan order selection, and specifically relates to a decoder for decoding coefficients of blocks of a video sequence and to an encoder for encoding coefficients of blocks of a video sequence.

BACKGROUND

Digital video communication and storage applications are implemented by a wide range of digital devices, such as digital cameras, cellular radio telephones, laptops, broadcasting systems, and video teleconferencing systems. One of the most important and challenging tasks of these applications is video compression. The task of video compression is complex and is constrained by two contradicting parameters: compression efficiency and computational complexity. Video coding standards, such as ITU-T H.264/AVC or High-Efficiency Video Coding (HEVC) standard ITU-T H.265/HEVC, provide a good tradeoff between these parameters. For that reason support of video coding standards is a mandatory requirement for almost any video compression application.

The state-of-the-art video coding standards are based on partitioning a source picture into blocks. Processing of these blocks depends on their size, spatial position and a coding mode specified by an encoder. Coding modes can be classified into two groups according to the type of prediction: intra- and inter-prediction modes. Intra-prediction modes use pixels of the same picture to generate reference samples to calculate the prediction values for the pixels of the block being reconstructed. Intra-prediction can be also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder like e.g. Context-Adaptive Binary Arithmetic Coding (CABAC) for AVC/H.264 and HEVC/H.265.

Evidently, prediction errors have different statistics for different prediction mode and strongly depend on content to be predicted. Hence, different transforms are profitable from the point of view of compression performance for different cases. To increase the coding efficiency of the transform coding stage, multiple transforms can be used that possesses different energy compaction for different particular cases.

The ITU-T H.265/HEVC standard known e.g. from ISO/IEC 23008-2:2013, "Information technology—High efficiency coding and media delivery in heterogeneous environments—Part 2: High efficiency video coding", November 2013, declares a set of state-of-the-art video coding tools that provide a reasonable tradeoff between coding efficiency and computational complexity. An overview on the ITU-T H.265/HEVC standard is given in the article by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g. coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction PU specifies prediction mode for a set of transform units (TUs). A TU can have different sizes (e.g., 4×4, 8×8, 16×16 and 32×32 pixels) and can be processed in different ways. For a TU transform coding is being performed, i.e. the prediction error is being transformed with a discrete cosine transform or a discrete sine transform—in the HEVC/H.265 standard, it is applied to intra-coded blocks—and quantized. Hence, reconstructed pixels contain quantization noise and blocking artefacts that may influence prediction accuracy.

In all the prior video coding standards except HEVC/H.265, only one transform was used to keep design simple. The HEVC/H.265 standard specifies two transforms for intra-coding: DST for 4×4 blocks as this transform provides a better energy compaction for small intra-predicted blocks, and DCT for other blocks.

In addition, a mode-dependent coefficient scan (MDCS) technique is adopted for the HEVC/H.265 standard. The basic idea behind it is to select a scan order subject to a selected intra-prediction mode. For intra-coded blocks, the scanning order of a 4×4 transform block (TB) and a 8×8 luma TB is determined by the intra prediction mode, see Joel Sole, Rajan Joshi, Nguyen Nguyen, Tianying Ji, Marta Karczewicz, Gordon Clare, Felix Henry, and Alberto Dueñas. "Transform Coefficient Coding in HEVC," IEEE Transactions on Circuits and Systems for Video Technology, vol. 22, no. 12, December 2012, pp. 1765-1777. Each of the 35 intra-prediction modes uses one of the three possible scanning orders: diagonal, horizontal, or vertical. A look-up table maps the intra-prediction mode to one of the scans.

This tool exploits the horizontal or vertical correlation of the residual depending on the intra prediction mode. For example, for a horizontal prediction mode, transform coefficient energy is clustered in the first few columns, so a vertical scan results in fewer bins being entropy coded. Similarly for a vertical prediction, a horizontal scan is beneficial. Experiments showed that including horizontal and vertical scans for large TBs offers little compression efficiency, so the application of these scans is limited to the two smaller TBs.

Techniques similar to MDCS are considered in the document Yung-Lyul Lee, Ki-Hun Han, Dong-Gyu Sim, and Jeongil Seo. "Adaptive Scanning for H.264/AVC Intra Coding," ETRI Journal, Volume 28, Number 5, October 2006, pp. 668-671, in the document Byeong-Doo Choi, Jin-Hyung Kim, and Sung-Jea Ko. "Adaptive Coefficient Scanning Based on the Intra Prediction Mode," ETRI Journal, Volume 29, Number 5, October 2007, pp. 694-696, and in the document Md. Salah Uddin Yusuf and Mohiuddin Ahmad. "A Novel Scanning Scheme for Directional Spatial Prediction of AVS Intra Coding," International Journal of Advanced Research in Electrical, Electronics and Instrumentation Engineering, Vol. 2, Issue 8, August 2013, pp. 4120-4126. The scan orders differ from such ones that are used in the HEVC/H.265 standard. Also, it is proposed to map intra-prediction modes to scan orders.

In addition, partitioning mode—as known from Bae Keun Lee, Jae Cheol Kwon, and Joo Young Kim. "Method and Apparatus for Coefficient Scan Based on Partition Mode of Prediction Unit," United States Patent Application Publication, US 2014/0314143 A1, PCT/KR2012/009373, Nov. 8, 2012—, and quantization parameters (QP)—as known from Thai-Ha Nguyen, Yoichi Yagasaki, and Ali Tabatabai. "QP adaptive coefficients scanning and application," United States Patent Application Publication, US 2011/0249726 A1, Apr. 1, 2011—can be used as features for selecting a scan order not just for intra—but for inter-coding as well.

So, there is a huge variety of scan orders, which can be efficient for the same modes and TU sizes. It is the main reason why an RDO (Rate-Distortion Optimization)-based or similar—e.g., based on distortion or activity analysis—procedure can be used to make a final decision on what of the potential scan orders should be selected.

An example of how it is possible to select a scan order in an RDO-based procedure is known e.g. from Muhammed Zeyd Coban and Marta Karczewicz. "Adaptive scanning of transform coefficients for video coding," United States Patent Application Publication, US 2012/0099646 A1, Oct. 17, 2011. In this case, the scan order that provides the lowest RD-cost is selected. Thus, the main advantage of this approach is that a selected scan order provides the highest coding gain. Hence, the coding efficiency of this approach is higher than for other methods if the signaling overhead is not taken into account.

This prior art proposes two algorithms for selecting the scan order providing the highest coding gain. The main distinguished feature between these two algorithms is that different mechanisms are used for detecting such TBs where this technique of adaptive scan order selection is inapplicable, i.e. a default scan order is used. In a first algorithm, the number of significant transform coefficients is compared with a threshold number. In a second algorithm, the position of the last significant transform coefficients is compared with a threshold position. In contrast to the previously described techniques, a selected scan order should be signaled for these both cases, so that a decoder can apply a correct scan order to the received transform coefficients. So, the main disadvantage of the approaches using a RDO-based decision making procedure is a signaling overhead.

Another way to improve the compression efficiency as compared to MDCS is to adapt a scan order according to the gathered statistics for blocks that have the similar values of parameters such as intra-prediction mode, partitioning mode, block size, etc. instead of using a priori defined scan orders. Accordingly, initial scan orders are defined for using in the cases when a statistics is not enough. When the amount of the blocks used for collecting the statistics exceeds a threshold, the scan order may be adapted based on the collected statistics, see Yan Ye and Marta Karczewicz. "Adaptive coefficient scanning for video coding," United States Patent, U.S. Pat. No. 8,488,668 B2, Jun. 4, 2008. A similar approach is known from Sridhar Srinivasan. "Adaptive coefficient scan order," European Patent Specification, EP 1679903 B1, 30.11.2005.

However, such an adaptive scan order based on gathered statistics of previously encoded or decoded blocks does not always provide a coding efficiency that is higher than predefined scan orders such as zig-zag, diagonal, vertical, horizontal, clockwise and counterclockwise helix scans, etc.

SUMMARY

Having recognized the above-mentioned disadvantages and problems, the present disclosure aims to improve the state of the art. In particular, an object of the present disclosure is to provide a video decoder, a decoding method, a video encoder, and an encoding method for an improved coding efficiency.

The present disclosure particularly intends to improve coding efficiency by means of an improved scan order for scanning a coefficient matrix into one or more coefficient vectors or for inverse scanning one or more coefficient vectors into a coefficient matrix.

Moreover, the present disclosure intends to improve coding efficiency by reducing the signaling overhead.

The above-mentioned object of the present disclosure is achieved by the solution provided in the enclosed independent claims. Advantageous implementations of the present disclosure are further defined in the respective dependent claims.

A first aspect of the present disclosure provides a decoder for decoding coefficients of blocks of a video sequence from a bitstream. The decoder comprises a scan pattern list module configured to provide one or more pre-defined scan orders. A scan order is also known in the art as a scan pattern. The decoder comprises a scan order generator configured to generate one or more scan orders. The decoder comprises a scan order selector configured to select a scan order for each block from the pre-defined and generated scan orders on the basis of scan order information contained in the bitstream. The decoder comprises a decoding module configured to decode one or more coefficient vectors of each block from the bitstream. The decoder comprises a deserializer configured to inverse scan, for each block, the one or more coefficient vectors of that block according to the scan order selected for that block so as to obtain a coefficient matrix. The scan order generator is configured to generate the one or more scan orders depending on one or more previously obtained coefficient matrices of blocks of the video sequence.

Thereby, the present disclosure is advantageous in that it provides both pre-defined scan orders and content-adaptive generated scan orders. By extending the set of available scan orders, the rate-distortion efficiency of quantization may be accordingly improved.

In an implementation form of the decoder according to the first aspect of the disclosure, the scan pattern list module is configured to provide one or more pre-defined scan orders for each of a plurality of coding parameter sets. The scan order generator is configured to generate a scan order for each of the coding parameter sets depending on one or more previously obtained coefficient matrices associated with that coding parameter set. The scan order selector is configured to select a scan order for each block by determining a coding parameter set of that block, and selecting the scan order for the coefficient matrix obtained for that block from the pre-defined and generated scan orders for the determined coding parameter set.

Thereby, both pre-defined scan orders and content-adaptive generated scan orders may be provided for each coding parameter set. As such, different scan orders may be generated for different coding parameter sets, such that the set of available scan orders may be increased and adapted to each coding parameter set. Therefore, the selected scan order may further improve the rate-distortion efficiency.

Particularly, each coding parameter set may correspond, for example, to a combination of one or more of a prediction mode, a partition mode, one or more transform parameters, and one or more quantization parameters.

In an implementation form of the decoder according to the first aspect of the disclosure, the decoder comprises a coefficient distribution estimator configured to provide, for each of the coding parameter sets, a distribution statistics of one or more previously obtained coefficient matrices associated with that coding parameter set. The scan order generator is configured to generate the scan order for each of the coding parameter sets depending on the distribution statistics for that coding parameter set.

Thereby, the generated scan orders may reflect a distribution statistics of previous coefficient matrices, The generated scan orders may thus provide a good coding efficiency for subsequent coefficient matrices if the distribution statistics of the subsequent matrices is similar to that of the previous coefficient matrices.

In an implementation form of the decoder according to the first aspect of the disclosure, if the scan order selected for a given block is pre-defined, the coefficient distribution estimator is configured not to update or is configured to reset the distribution statistics for the coding parameter set of the given block.

Thereby, if the scan order selected for a given block is a pre-defined scan order, this means that, for the coding parameter set of the given block, the generated scan order may provide a coding efficiency that is worse than that of the pre-defined scan orders. Therefore, the given block presents a distribution statistics that does not correspond to that of the previous coefficient matrices, so that the distribution statistics of the given block is preferably not used for updating the distribution statistics provided by the coefficient distribution estimator. Alternatively, it may be preferable to reset the distribution statistics provided by the coefficient distribution estimator since the statistics of previous coefficient matrices may not correspond anymore to the statistics of present coefficient matrices.

In an implementation form of the decoder according to the first aspect of the disclosure, the decoding module is configured to parse, for each block, coding parameter information from the bitstream. The scan order selector is configured to determine the coding parameter set of a given block according to the parsed coding parameter information for that given block.

Thereby, the decoder may obtain information regarding the coding parameter set and use the pre-defined and generated scan orders that correspond to this coding parameter set, so as to improve the coding efficiency.

In an implementation form of the decoder according to the first aspect of the disclosure, the decoding module is configured to parse the scan order information identifying the selected scan order from the bitstream.

Thereby, the decoder is able to identify the selected scan order from the bitstream and, depending on whether this selected scan order is pre-defined or generated, the decoder may correctly inverse scan the coefficient vectors and may, e.g., correctly update or not the distribution statistics provided by the coefficient distribution estimator.

The functions of the decoder according to the first aspect of the disclosure and any functions of any of its implementation forms may be performed by a processor or a computer, and any of their means may be implemented as software and/or hardware in such a processor or computer.

A second aspect of the present disclosure provides a method for decoding coefficients of blocks of a video sequence from a bitstream. The method comprises providing one or more pre-defined scan orders. The method comprises generating one or more scan orders. The method comprises selecting a scan order for each block from the pre-defined and generated scan orders on the basis of scan order information contained in the bitstream. The method comprises decoding one or more coefficient vectors of each block from the bitstream. The method comprises inverse scanning, for each block, the one or more coefficient vectors of that block according to the scan order selected for that block so as to obtain a coefficient matrix. Generating one or more scan orders comprises generating the one or more scan orders depending on one or more previously obtained coefficient matrices of blocks of the video sequence.

Further features or implementations of the method according to the second aspect of the disclosure may perform the functionality of the decoder according to the first aspect of the disclosure and its different implementation forms.

The method according to the second aspect of the disclosure or any of its implementation forms may be performed by a processor or a computer.

A third aspect of the present disclosure provides an encoder for encoding coefficients of blocks of a video sequence into a bitstream, the coefficients of each block being contained in a respective coefficient matrix. The encoder comprises a scan pattern list module configured to provide one or more pre-defined scan orders. The encoder comprises a scan order generator configured to generate one or more scan orders. The encoder comprises a scan order selector configured to select a scan order for each block from the pre-defined and generated scan orders. The encoder comprises a serializer configured to scan, for each block, the coefficient matrix of that block according to the scan order selected for that block so as to obtain one or more coefficient vectors. The encoder comprises a coding module configured to code the coefficient vectors into the bitstream. The scan order generator is configured to generate the one or more scan orders depending on one or more previously scanned coefficient matrices of blocks of the video sequence.

Thereby, the present disclosure is advantageous in that it provides both pre-defined scan orders and content-adaptive generated scan orders. By extending the set of available scan orders, the rate-distortion efficiency of quantization may be accordingly improved.

In an implementation form of the encoder according to the third aspect of the disclosure, the scan pattern list module is configured to provide one or more pre-defined scan orders for each of a plurality of coding parameter sets. The scan order generator is configured to generate a scan order for each of the coding parameter sets depending on one or more previously scanned coefficient matrices associated with that coding parameter set. The scan order selector is configured to select a scan order for each block by determining a coding parameter set of that block, and selecting the scan order for the coefficient matrix of that block from the pre-defined and generated scan orders for the determined coding parameter set.

Thereby, both pre-defined scan orders and content-adaptive generated scan orders may be provided for each coding parameter set. As such, different scan orders may be generated for different coding parameter sets, such that the set of available scan orders may be increased and adapted to each coding parameter set. Therefore, the selected scan order may further improve the rate-distortion efficiency.

Particularly, each coding parameter set may correspond to a combination of one or more of a prediction mode, a partition mode, one or more transform parameters, and one or more quantization parameters.

In an implementation form of the encoder according to the third aspect of the disclosure, the encoder comprises a coefficient distribution estimator configured to provide, for each of the coding parameter sets, a distribution statistics of one or more previously scanned coefficient matrices associated with that coding parameter set. The scan order generator is configured to generate the scan order for each of the coding parameter sets depending on the distribution statistics for that coding parameter set.

Thereby, the generated scan orders may reflect a distribution statistics of previous coefficient matrices, such that these generated scan orders may provide a good coding efficiency for subsequent coefficient matrices in case the distribution statistics of the subsequent matrices is similar to that of the previous coefficient matrices.

In an implementation form of the encoder according to the third aspect of the disclosure, if the scan order selected for a given coefficient matrix is pre-defined, the coefficient distribution estimator is configured not to update or is configured to reset the distribution statistics for the coding parameter set of the given block.

Thereby, if the scan order selected for a given block is a pre-defined scan order, this means that, for the coding parameter set of the given block, the generated scan order may provide a coding efficiency that is worse than that of the pre-defined scan orders. Therefore, the given block presents a distribution statistics that does not correspond to that of the previous coefficient matrices, so that the distribution statistics of the given block is preferably not used for updating the distribution statistics provided by the coefficient distribution estimator. Alternatively, it may be preferable to reset the distribution statistics provided by the coefficient distribution estimator since the statistics of previous coefficient matrices may not correspond anymore to the statistics of present coefficient matrices.

In an implementation form of the encoder according to the third aspect of the disclosure, the encoder comprises a signaling module configured to add scan order information identifying the selected scan order in the bitstream.

Thereby, it is advantageous that the decoder is able to identify the selected scan order from the bitstream and, depending on whether this selected scan order is pre-defined or generated, the decoder may correctly inverse scan the coefficient vectors and may e.g. correctly update or not the distribution statistics provided by the coefficient distribution estimator.

In an implementation form of the encoder according to the third aspect of the disclosure, the scan order selector is configured to select the scan order from the pre-defined and generated scan orders based on a cost function.

Thereby, a procedure based on the cost function may be used to select precisely one scan order among the generated scan orders and the pre-defined scan orders. Accordingly, even if generated scan orders based on gathered statistics of previously encoded or decoded blocks do not provide a better coding efficiency than pre-defined scan orders, the scan order selection may improve the coding efficiency. Particularly, the cost function may for example be a Rate-Distortion Optimization (RDO) function.

The functions of the encoder according to the third aspect of the disclosure and any functions of any of its implementation forms may be performed by a processor or a computer, and any of their means may be implemented as software and/or hardware in such a processor or computer.

A fourth aspect of the present disclosure provides a method for encoding coefficients of blocks of a video sequence into a bitstream, the coefficients of each block being contained in a respective coefficient matrix. The method comprises providing one or more pre-defined scan orders. The method comprises generating one or more scan orders. The method comprises selecting a scan order for each block from the pre-defined and generated scan orders. The method comprises scanning, for each block, the coefficients of that block according to the scan order selected for that block so as to obtain one or more coefficient vectors. The method comprises coding the coefficient vectors into the bitstream. Generating one or more scan orders comprises generating the one or more scan orders depending on one or more previously scanned coefficient matrices of blocks of the video sequence.

Further features or implementations of the method according to the fourth aspect of the disclosure may perform the functionality of the encoder according to the third aspect of the disclosure and its different implementation forms.

The method according to the fourth aspect of the disclosure or any of its implementation forms may be performed by a processor or a computer.

A fifth aspect of the present disclosure provides a decoder, preferably according to the first aspect, for decoding coefficients of blocks of a video sequence from a bitstream. The decoder comprises a decoding module configured to decode one or more coefficient vectors of each block from the bitstream. The decoder comprises a check module configured to reconstruct, for at least one block, hidden information from one or more coefficients of that block, the hidden information constituting or forming part of scan order information associated with that block. The decoder comprises a scan order selector configured to select a scan order for each block from a set of scan orders, preferably from a set of pre-defined and generated scan orders, on the basis of the scan order information associated with that block. The decoder comprises a deserializer configured to inverse scan, for each block, the one or more coefficient vectors of that block according to the scan order selected for that block so as to obtain a coefficient matrix.

Thereby, the coding efficiency is advantageously improved in that the signaling overhead is reduced.

In an implementation form of the decoder according to the fifth aspect of the disclosure, the check module is configured to reconstruct, for at least one block, the hidden information from at least one hiding coefficient vector chosen from among the one or more coefficient vectors obtained for that block. Particularly, the one or more coefficient vectors may correspond to a respective coefficient group (CG), the hiding coefficient vector then corresponding to the coefficient group in which the data hiding is performed. Thereby, reconstructing the hidden information from several hiding coefficient vectors, e.g. preferably from several coefficient groups, is advantageous in that more bits can be hidden and a larger index for the scan order information can be reconstructed.

In an implementation form of the decoder according to the fifth aspect of the disclosure, the check module is configured to reconstruct, for at least one block, the hidden information from the hiding coefficient vector depending on a hiding condition, the hiding condition comprising a comparison of a parameter depending on the hiding coefficient vector to a threshold. Thereby, the hiding is facilitated.

In an implementation form of the decoder according to the fifth aspect of the disclosure, the parameter is:

a number of significant coefficients within the hiding coefficient vector, or a distance between first and last significant coefficients within the hiding coefficient vector, or a ratio of a maximum absolute value to a minimum absolute non-zero value of the coefficients within the hiding coefficient vector. The hiding condition is true if the parameter is above the threshold, and false if the parameter is below the threshold. Thereby, the hiding condition is advantageously provided.

In an implementation form of the decoder according to the fifth aspect of the disclosure, the check module is configured to check the hiding condition, and to reconstruct the hidden information from the hiding coefficient vector if the hiding condition is true. Thereby, the scan order may be selected without additional side information from the bitstream.

In an implementation form of the decoder according to the fifth aspect of the disclosure, if the hiding condition is false, the scan order selector is configured to select a pre-defined default scan order. Thereby, a scan order may be selected even if no hiding was possible on the encoder side.

In an implementation form of the decoder according to the fifth aspect of the disclosure, the check module is configured to reconstruct the hidden information from the hiding coefficient vector by applying a check-function to the hiding coefficient vector, a result of the check-function being the hidden information. Thereby, the scan order may be advantageously obtained from the coefficients.

In an implementation form of the decoder according to the fifth aspect of the disclosure, the result of the check-function depends on coordinates (x, y), within the coefficient matrix, of the last significant coefficient of the hiding coefficient vector. The check-function may, for example, be the following function:

$$\mathrm{mod}(x+y+R,2)$$

x and y being the coordinates, and R being an integer value. Thereby, the result of the check-function may be obtained directly from coefficient coordinates.

In an implementation form of the decoder according to the fifth aspect of the disclosure, the check module is configured to reconstruct, for a first block, hidden information from one or more coefficients of the first block, the hidden information constituting or forming part of scan order information associated with the first block, and the scan order selector is configured to select, for the first and at least a second block, a scan order on the basis of the scan order information associated with the first block. Thereby, this implementation form provides a "merge mode" decoding, in which the value of the selected scan order for the second block is reconstructed/predicted using the coefficient values of the first block without hiding anything within the coefficients of the second block. For example, the first and second blocks are spatial neighbors.

Particularly, the scan order selector may be configured to select, for a group of blocks, a scan order on the basis of the scan order information associated with the first block, wherein the group of blocks may comprise the first block and a plurality of second blocks. The group of blocks may include several blocks within a group of blocks having at least one non-default scan index hidden within their coefficients. Alternatively, the group of blocks may include several sequentially encoded blocks, so that said encoded blocks have the same scan index. Alternatively, the group of blocks may include several blocks and/or several sequentially encoded blocks having coefficients for which the hiding condition is false.

Particularly, in the merge mode several options are available for the decoder to know that no scan order information is hidden in the coefficients of the at least one second block. Firstly, side information may be encoded in the bitstream, e.g., a flag for a group of blocks that enables or disables the usage of merge mode for them. Secondly, without side information, it is proposed to apply merge rule to the second block depending on hiding condition and coding parameter set of the first block and/or the second block. In other words, a merge is applied to the second block if the hiding condition is not met for the second block, i.e. the scan order for the second block is selected on the basis of the scan order information associated with the first block. Thirdly, a combination of the first two alternatives is proposed, said combination comprising side information in the bitstream and applying a merge depending on hiding condition.

The functions of the decoder according to the fifth aspect of the disclosure and any functions of any of its implementation forms may be performed by a processor or a computer, and any of their means may be implemented as software and/or hardware in such a processor or computer.

A sixth aspect of the present disclosure provides a method, preferably according to the second aspect, for decoding coefficients of blocks of a video sequence from a bitstream. The method comprises decoding one or more coefficient vectors of each block from the bitstream. The method comprises reconstructing, for at least one block, hidden information from one or more coefficients of that block, the hidden information constituting or forming part of scan order information associated with that block. The method comprises selecting a scan order for each block from a set of scan orders, preferably from a set of pre-defined and generated scan orders, on the basis of the scan order information associated with that block. The method comprises inverse scanning, for each block, the one or more coefficient vectors of that block according to the scan order selected for that block, thereby obtaining a coefficient matrix.

Further features or implementations of the method according to the sixth aspect of the disclosure may perform the functionality of the decoder according to the fifth aspect of the disclosure and its different implementation forms.

The method according to the sixth aspect of the disclosure or any of its implementation forms may be performed by a processor or a computer.

A seventh aspect of the present disclosure provides an encoder, preferably according to the third aspect, for encoding coefficients of blocks of a video sequence into a bitstream, the coefficients of each block being contained in a respective coefficient matrix. The encoder comprises a scan order selector configured to select a scan order for each block from a set of scan orders, preferably from a set of pre-defined and generated scan orders. The encoder comprises a serializer configured to scan, for each block, the coefficient matrix of that block according to the scan order selected for that block so as to obtain one or more coefficient vectors. The encoder comprises a hiding module configured to hide, for at least one block, scan order information identifying the scan order selected for that block at least partially in one or more coefficients of that block (i.e. configured to hide that scan order information or part of it in those one or more coefficients). The encoder comprises a coding module configured to code the coefficient vectors into the bitstream. Thereby, the coding efficiency may be improved by reducing the signaling overhead.

In an implementation form of the encoder according to the seventh aspect of the disclosure, the hiding module is configured to hide, for at least one block, the scan order information in at least one hiding coefficient vector chosen from among the one or more coefficient vectors obtained for that block.

In an implementation form of the encoder according to the seventh aspect of the disclosure, the hiding module is configured to hide, for at least one block, the scan order information in the hiding coefficient vector depending on a hiding condition, the hiding condition comprising a comparison of a parameter depending on the hiding coefficient vector to a threshold.

In an implementation form of the encoder according to the seventh aspect of the disclosure, the parameter is:
- a number of significant coefficients within the hiding coefficient vector, or
- a distance between first and last significant coefficients within the hiding coefficient vector, or
- a ratio of a maximum absolute value to a minimum absolute non-zero value of the coefficients within the hiding coefficient vector, wherein the hiding condition is true if the parameter is above the threshold, and false if the parameter is below the threshold.

In an implementation form of the encoder according to the seventh aspect of the disclosure, the hiding module is configured to check the hiding condition, and to hide the scan order information in the hiding coefficient vector if the hiding condition is true.

In an implementation form of the encoder according to the seventh aspect of the disclosure, if the hiding condition is false, the scan order selector is configured to select recursively another scan order from the set of scan orders until the hiding condition for that other selected scan order is true. Thereby, selecting other scan orders is advantageous in that it is possible to carry out data hiding even if the first selected scan order would imply a false hiding condition.

In an implementation form of the encoder according to the seventh aspect of the disclosure, if the hiding condition is false and the selected scan order is a pre-defined default scan order, the hiding module is configured not to hide the scan order information in the hiding coefficient vector.

In an implementation form of the encoder according to the seventh aspect of the disclosure, the hiding module is configured to hide, for at least one block, the scan order information in the hiding coefficient vector by:
- applying a check-function to the hiding coefficient vector so as to obtain a result of the check-function,
- determine whether the result of the check-function corresponds to the scan order information,
- if not, modify the hiding coefficient vector so that the result of the check-function corresponds to the scan order information.

In an implementation form of the encoder according to the seventh aspect of the disclosure, the result of the check-function depends on coordinates (x, y), within the coefficient matrix, of the last significant coefficient of the hiding coefficient vector. The check-function may, for example, be the following function:

$$\mathrm{mod}(x+y+R,2)$$

x and y being the coordinates, and R being an integer value.

In an implementation form of the encoder according to the seventh aspect of the disclosure, if an identical scan order is selected by the scan order selector for a first and at least a second block, the hiding module is configured to hide scan order information identifying the identical scan order in one or more coefficients of only the first block. Thereby, an encoding according a "merge mode" is possible. In such a mode, preferably the scan order information identifying the identical scan order is not hidden in coefficients of the second block. In other words, the value of the selected scan order for the second block is reconstructed/predicted at the decoder side using the scan order information hidden in coefficients of the first block. The first and second blocks are, e.g., spatial neighbors or, e.g., successive blocks in the bitstream. Thus, the scan order information of the second block may be transmitted to the decoder without hiding anything within the coefficients of the second block.

Particularly, a group of blocks comprising the first block and the one ore more second blocks may be a group of blocks having at least one non-default scan index hidden within their coefficients. Alternatively, the group of blocks may include several sequentially encoded blocks, so that said encoded blocks have the same scan index. Alternatively, the group of blocks may include several blocks and/or several sequentially encoded blocks having coefficients for which the hiding condition is false.

Particularly, in the merge mode several options are available for the decoder to know that no scan order information is hidden in the coefficients of the at least one second block. Firstly, the encoder adds side information in the bitstream, e.g. a flag that enables or disables the usage of merge mode for one or more blocks, e.g. for the one or more second blocks. Secondly, without side information, it is proposed to apply merge rule to the second block depending on hiding condition and coding parameter set of the first block and/or the second block. In other words, a merge is applied to the second block if hiding condition is not met for the second block, i.e. the scan order for the second block is selected on the basis of the scan order information associated with the first block. Thirdly, a combination of the first two alternatives is proposed, said combination comprising side information in the bitstream and applying a merge depending on hiding condition.

The functions of the encoder according to the seventh aspect of the disclosure and any functions of any of its implementation forms may be performed by a processor or a computer, and any of their means may be implemented as software and/or hardware in such a processor or computer.

An eighth aspect of the present disclosure provides a method, preferably according to the fourth aspect of the disclosure, for encoding coefficients of blocks of a video sequence into a bitstream, the coefficients of each block being contained in a respective coefficient matrix. The method comprises selecting a scan order for each block from a set of scan orders, preferably from a set of pre-defined and generated scan orders. The method comprises scanning, for each block, the coefficient matrix of that block according to the scan order selected for that block so as to obtain one or more coefficient vectors. The method comprises hiding, for at least one block, scan order information identifying the scan order selected for that block at least partially in one or more coefficients of that block. The method comprises coding the coefficient vectors into the bitstream.

Further features or implementations of the method according to the eighth aspect of the disclosure may perform the functionality of the encoder according to the seventh aspect of the disclosure and its different implementation forms.

The method according to the eighth aspect of the disclosure or any of its implementation forms may be performed by a processor or a computer.

A ninth aspect of the present disclosure provides a computer program comprising a program code for performing the method according to the second, fourth, sixth or eighth aspect of the disclosure, when the computer program runs on a computing device.

It has to be noted that all devices, elements, units and means described in the present application can be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which FIG. 1 shows a video encoder according to an embodiment of the present disclosure.

FIG. 2 shows a video decoder according to an embodiment of the present disclosure.

FIGS. 7 and 8 show a hiding condition according to an embodiment of the present disclosure.

FIG. 9 shows an entropy decoding of coefficients according to the prior art.

DETAILED DESCRIPTION OF EMBODIMENTS

Figure 3:
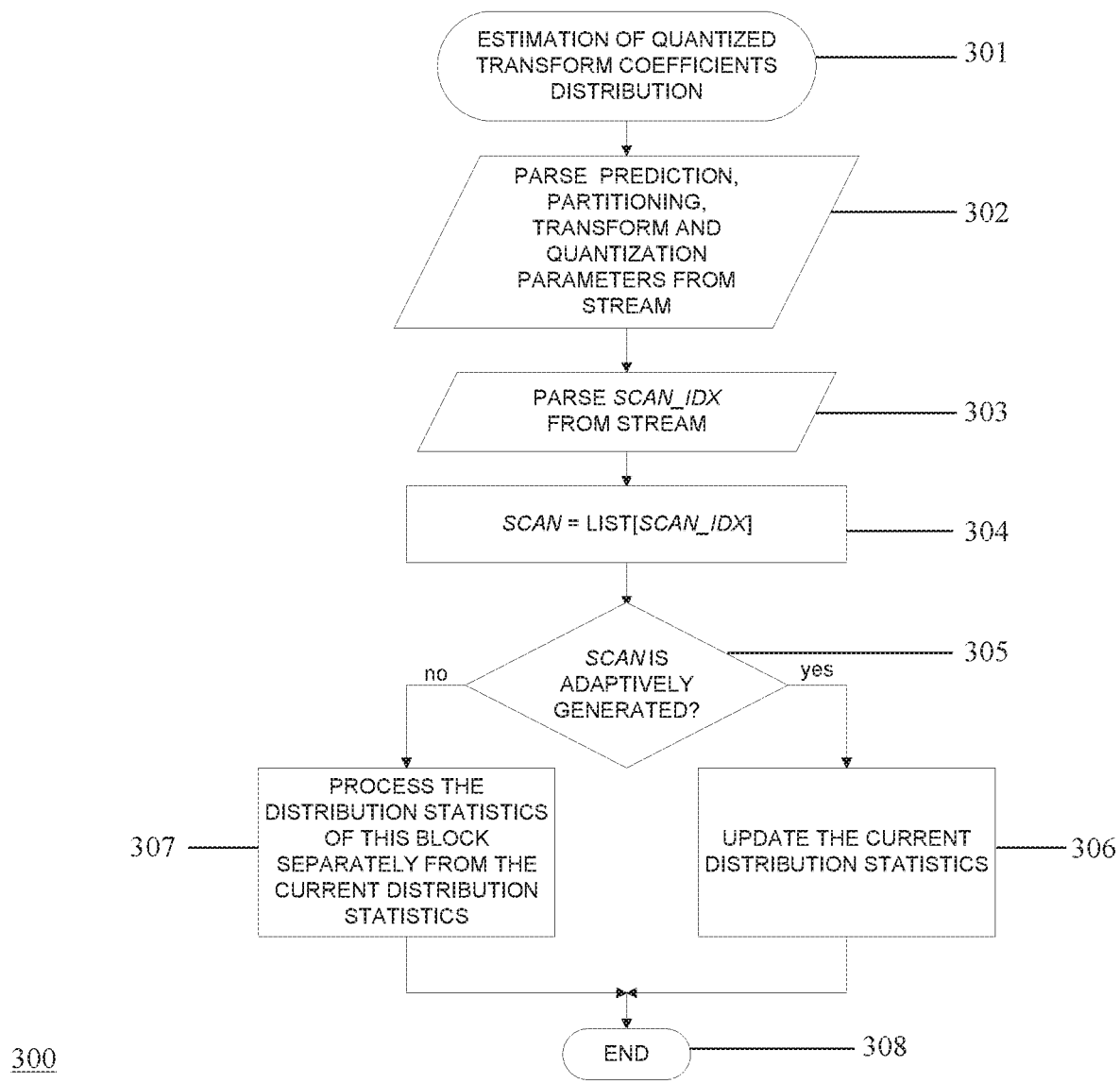
FIG. 3 shows a flowchart of coefficient distribution estimation at the video decoder according to an embodiment of the present disclosure.

FIG. 1 shows a video encoder according to an embodiment of the present disclosure, and particularly shows an encoder 100 for encoding coefficients of blocks of a video sequence into a bitstream 107, the coefficients of each block being contained in a respective coefficient matrix.

The encoder comprises a scan pattern list module 110 configured to provide one or more pre-defined scan orders.

The encoder comprises a scan order generator 111 configured to generate one or more scan orders.

The encoder comprises a scan order selector 109 configured to select a scan order for each block from the pre-defined and generated scan orders.

The encoder comprises a serializer 104 configured to scan, for each block, the coefficient matrix of that block according to the scan order selected for that block so as to obtain one or more coefficient vectors.

The encoder comprises a coding module 106 configured to code the coefficient vectors into the bitstream 107.

The scan order generator 111 is configured to generate the one or more scan orders depending on one or more previously scanned coefficient matrices of blocks of the video sequence.

FIG. 2 shows a video decoder according to an embodiment of the present disclosure, and particularly a decoder 200 for decoding coefficients of blocks of a video sequence from a bitstream 207.

The decoder comprises a scan pattern list module 210 configured to provide one or more pre-defined scan orders.

The decoder comprises a scan order generator 211 configured to generate one or more scan orders.

The decoder comprises a scan order selector 209 configured to select a scan order for each block from the pre-defined and generated scan orders on the basis of scan order information SCAN_IDX contained in the bitstream.

The decoder comprises a decoding module 206 configured to decode one or more coefficient vectors of each block from the bitstream 207.

The decoder comprises a deserializer 204 configured to inverse scan, for each block, the one or more coefficient vectors of that block according to the scan order selected for that block so as to obtain a coefficient matrix.

The scan order generator 211 is configured to generate the one or more scan orders depending on one or more previously obtained coefficient matrices of blocks of the video sequence.

Particularly, FIG. 1 shows an example of an encoder-side residual coding part with content-adaptive scan order selection. In the example, the encoder 100 is configured to apply inter- or intra-prediction to each block of each picture of the video sequence. An intra-prediction mode uses pixels of the same picture to generate reference samples to calculate the prediction values for the pixels of the block being reconstructed. An inter-prediction mode is designed for temporal prediction and uses reference samples of previous or next pictures to predict pixels of the block of the current picture. The result of the prediction stage may be a residual signal 101 that is the difference between an original signal of a block and its prediction signal obtained via inter- or intra-prediction.

A prediction mode for obtaining the residual signal 101 may correspondingly refer to either intra- or inter-prediction mode. Further on, the prediction mode may correspond to any of a plurality of available prediction modes or directions. For example, the plurality of available prediction modes may comprise up to 35 intra prediction modes, which may include 33 directional modes and 2 non-directional modes, such as a direct current (DC) prediction mode and a planar prediction mode. The 33 directional modes may cover a π-radian or 180-degree angular range. If the direction of a vertical mode is regarded as zero degree, the 33 directional modes may be symmetrical about the −45 degrees axis. With respect to the prediction mode, the encoder may be configured to determine, for a given block, one of the plurality of available prediction modes based on a Rate-Distortion Optimization (RDO).

A Coding Tree Unit (CTU) is the root of a coding a structure of the video sequence of a pre-defined size, containing a part of a picture (e.g. 64×64 pixels). A CTU can be partitioned into Coding Units (CUs). A CU is a basic coding structure of the video sequence of a pre-defined size, containing a part of a picture which belongs to a CTU. A CU can be partitioned into further CUs. A Prediction Unit (PU) is a coding structure which is the result of the partitioning of a CU. A PU can be partitioned to several Transform Unit (TUs) or coincide with a single TU. A PU can be intra- or inter-predicted according to the type of processing applied for the pixels of PU. In case of inter-prediction, a PU represents an area of pixels that is processed by motion compensation using a motion vector specified for a PU.

In this respect, a partition mode may depend on the PU, and particularly on the size and/or the orientation of the PU. The partition mode may correspond to any of a plurality of available partition modes. The encoder may be configured to determine, for a block or PU, one of the plurality of available partition modes based on an RDO method. For example, the partition mode may correspond to a horizontally oriented shape, in which a CU may be partitioned into 2N×N PUs or blocks. Also, the partition mode may correspond to a vertically oriented shape, in which a CU may be partitioned into N×2N PUs or blocks, or to a square shape, in which a CU may be partitioned into 2N×2N PUs or blocks.

The residual signal 101 may be provided to a transform module 102 for transform coding the residual signal 101 so as to obtain transform coefficients. Particularly, for intra prediction a PU may specify a prediction mode for a set of TUs. A TU can have different sizes—e.g., 4×4, 8×8, 16×16 and 32×32 pixels—and can be processed in different ways. Examples of transforms that may be applied to a residual signal comprise for example Discrete Cosine Transform (DCT) and Discrete Sine Transform (DST).

In this respect, a transform parameter may be the size or the shape of the TU, or both size and shape. A further transform parameter may be the transform being applied, e.g. DCT or DST among others.

The residual signal 101 calculated for a block of the source picture is transformed by the transform module 102 and then quantized by a quantization module 103. The quantization module 103 processes the transform coefficients so as to obtain quantized transform coefficients (QTCs) in the form of a coefficient matrix.

In this respect, a quantization parameter may correspond to the number of significant coefficients of the coefficient matrix, i.e. the number of coefficients of the coefficient matrix that have a non-zero value.

The coefficient matrix is serialized by means of the serializer 104 by scanning in an order determined by the scan order selector 109. The scan order can be either selected from the pre-defined scan orders provided by the scan pattern list 110 or from the generated scan orders provided by the scan order generator 111. The scan orders provided by the scan pattern list 110 are pre-defined for both the encoder 100 and the decoder 200 sides and thus a scan order selected from the scan pattern list 110 is static, i.e. is not modified throughout the whole encoding or decoding process. The scan orders provided by the scan order generator 111 are dynamic, i.e. are generated depending on one or more previously obtained coefficient matrices of blocks of the video sequence. Particularly, the generated scan orders may be generated according to distribution statistics of coefficients matrices during the encoding or decoding process.

The one or more coefficient vectors obtained by the serializer 104 from a coefficients matrix are stored in a quantized coefficients buffer 105. The coding module 106 may be in form of an entropy coding module for entropy coding the coefficient vectors into the bitstream 107. The scan order that is selected by the scan order selector 109 may be identified by means of a scan index or scan order information SCAN_IDX.

This scan index information may be explicitly added to the bitstream 107, i.e. the value of the scan order information SCAN_IDX may be stored in the bitstream 107 by means of a dedicated variable or parameter. Alternatively, a hiding module 112 may be configured to hide at least partially the scan order information SCAN_IDX in the coefficient vectors, i.e. in the values of the coefficient matrix after serialization. For example, the hiding module 112 may correspondingly perform adjustments of the coefficients stored in the quantized coefficients buffer 105 so that a corresponding check module located in a check module 212 of the decoder 200 can derive the scan order information SCAN_IDX by applying a check function to them. The resulting adjusted coefficients or coefficient vectors stored in the quantized coefficients buffer 105 may then be entropy encoded and transmitted to the decoder 200 in the bitstream 107.

The coefficients of the one or more coefficient vectors stored in the quantized coefficients buffer 105 may then be adjusted or not, depending on whether the scan order information SCAN_IDX is explicitly or implicitly transmitted in the bitstream 107, i.e. depending on whether the scan order information is hidden or not.

Particularly, the scan pattern list module 110 is configured to provide one or more pre-defined scan orders for each of a plurality of coding parameter sets. The scan order generator 111 is configured to generate a scan order for each of the coding parameter sets depending on one or more previously scanned coefficient matrices associated with that coding parameter set. The scan order selector 109 is configured to select a scan order for each block by:
  determining a coding parameter set of that block, and
  selecting the scan order for the coefficient matrix of that block from the pre-defined and generated scan orders for the determined coding parameter set.

In this respect, a coding parameter set corresponds to a particular combination of at least one or more of:
  a prediction mode,
  a partition mode,
  one or more transform parameters, and
  one or more quantization parameters.

The prediction mode, partition mode, transform parameters, and quantization parameters are generally referred to by reference 108 in FIG. 1. For example, a coding parameter set can correspond to only a prediction mode (e.g. a specific directional intra prediction mode), to only a partition mode (e.g. a specific orientation of the PU), to only one or more transform parameters (e.g. a specific size and/or shape of the TU), or to only one or more quantization parameters (e.g. a specific number of significant coefficients of the coefficient matrix). Also, the coding parameter set may correspond to a particular combination of the prediction mode, partition mode, transform parameters, and/or quantization parameters.

The encoder 100 may comprise a coefficient distribution estimator 113 configured to provide, for each of the coding parameter sets, a distribution statistics of one or more previously scanned coefficient matrices associated with that coding parameter set. The scan order generator 111 is configured to generate the scan order for each of the coding parameter sets depending on the distribution statistics for that coding parameter set.

Particularly, the coefficients stored in the quantized coefficients buffer 105 are also a source for the coefficient distribution statistics estimation that is used by the scan order generator 111. However, before estimating the coefficients distribution, the stored coefficients are deserialized back from coefficients vector to a coefficient matrix by means of a deserializer 114.

The distribution statistics of a coefficient matrix preferably comprises, as defined in US 2008/0310504, an indication of the likelihood that a coefficient value in a position of the two-dimensional coefficient matrix is zero or non-zero and may, for example, comprise a count, a probability or other statistical metric associated with each of the coefficient positions of the two-dimensional coefficient matrix. A scan order generated depending on such a distribution statistics may correspondingly be a scan order that is configured to scan with higher priority the coefficient positions with a higher likelihood of having non-zero coefficients.

Particularly, if the scan order selected for a given block is a generated scan order, the coefficient distribution estimator 113 may be configured to update the distribution statistics for the coding parameter set of the given block according to distribution statistics of the coefficient matrix of the given block. The distribution statistics of the coefficient matrix of the given block may reflect whether or not the coefficient at a position in the coefficient matrix of the given block is zero or non-zero. The distribution statistics provided by the coefficient distribution estimator 113 may then for example be updated depending on said distribution statistics of the coefficient matrix of the given block.

Particularly, if the scan order selected for a given coefficient matrix is pre-defined, the coefficient distribution estimator 113 may be configured not to update or may be configured to reset the distribution statistics for the coding parameter set of the given block. Resetting the distribution statistics may for example consist in resetting said count, probability or other statistical metric. This update, non-update, or reset of the distribution statistics carried out by the coefficient distribution estimator 113 depending on whether the scan order selector 109 has selected a generated or pre-defined scan order is reflected in FIG. 1 by a dashed arrow from the scan order selector 109 to the coefficient distribution estimator 113.

The decoder of the proposed embodiment is shown in FIG. 14. Processing stages are similar to the ones of the encoder (see FIG. 13) and are applied in the inverse order. The most important difference is that the quantized coefficients buffer stores QTCs after they are deserialized, i.e. as a QTCs matrix but not QTCs as one ore more vectors.

Particularly, FIG. 2 shows an example of a residual decoding part with content-adaptive scan order selection. In the example, the decoder 200 is configured to obtain a residual signal 201 from the bitstream 207. After generate, by the decoding module 206 (e.g., an entropy decoding module) and the deserializer 204, the coefficient matrix comprising quantized transform coefficients, a quantized coefficients buffer 205 stores said coefficient matrix. The stored coefficient matrix is then processed by an inverse quantization module 203 and by an inverse transform module 202 to obtain the residual signal 201 corresponding to the residual signal 101 in the encoder 100. Using the residual signal 201, the encoded video sequence may be reconstructed according to known techniques.

The coefficient distribution estimator 213 of the decoder 200 may be similar or identical in function to the coefficient distribution estimator 113 of the encoder 100. In the example, they differ in that the coefficient distribution estimator 213 receives as input the coefficient matrix stored in the quantized coefficients buffer 205 while the coefficient distribution estimator 113 receives as input the coefficient matrix obtained from the deserializer 114.

The present disclosure proposes the combined use of pre-defined scan orders and generated scan orders at both encoder 100 and decoder 200 side depending on previously scanned, respectively obtained, coefficient matrices of blocks of the video sequence. Particularly, the generated scan orders are generated by analyzing a distribution statistics of the coefficients within the coefficient matrix, i.e. by analyzing a distribution of the quantized transform coefficients.

A particular feature of the proposed disclosure is that distribution statistics for quantized transform coefficients (QTCs) are estimated more precisely by taking the selected scan order into consideration, as shown for example in FIGS. 1 and 2 by the arrow between the scan order selector 109, 209 and the coefficient distribution estimator 113, 213. This more precise estimation may consist e.g. in updating, not updating, or resetting the distribution statistics as shown above.

The coefficient distribution can be estimated more accurately by splitting the source data into 4stationary periods and estimating the coefficient distribution only within these stationary periods. A stationary period is a number of blocks that have similar QTCs distribution and are spatially close to each other.

In the present disclosure, it is particularly proposed to detect a stationary period by introducing a threshold on the number of processed blocks that is signaled to have adaptively generated scan order. When the scan order is selected from the pre-defined scan orders provided by the scan pattern list module, there is no need to update the distribution statistics, because for this case the fact that the scan order is a pre-defined one indicates that the currently processed block belongs to different stationary period.

FIG. 3 shows a flowchart of distribution statistics estimation at the video decoder according to an embodiment of the present disclosure.

At the video decoder, the estimation 301 of the distribution statistics by the coefficient distribution estimator 213 comprises several steps.

In a step 302, the prediction mode, partition mode, transform parameters, and/or quantization parameters 208 for a block are parsed from the bitstream 207. Preferably, this parsing is carried out by the decoding module 206. According to the parsed information, the scan order selector 209 preferably determines the encoding mode of that block.

In a step 303, the scan order information SCAN_IDX identifying the selected scan order for that block is parsed from the bitstream 207. This parsing is preferably done by the decoding module 206.

In a step 304, the scan order selector 209 selects the scan order for that block from the pre-defined and generated scan orders on the basis of the parsed scan order information SCAN_IDX.

In a step 305, it is determined whether the selected scan order is a pre-defined scan order provided by the scan pattern list module 210 or a generated scan order provided by the scan order generator 211.

If the scan order selected for that block is a generated one (e.g., provided by the scan order generator 211), the coefficient distribution estimator 213 updates, in a step 306, the current distribution statistics. This current distribution statistics is obtained preferably from previous blocks. The current distribution statistics is updated according to a distribution statistics of the coefficient matrix obtained for that block.

If, however, the scan order selected for that block is a predefined one (e.g., provided by the scan pattern list module 210), the coefficient distribution estimator 213 processes, in a step 306, the distribution statistics of that block separately from the current distribution statistics. For example, the coefficient distribution estimator 213 may not update or may reset the current distribution statistics.

After step 306 or 307, the estimation 301 of the distribution statistics ends (in step 308).

Figure 4:
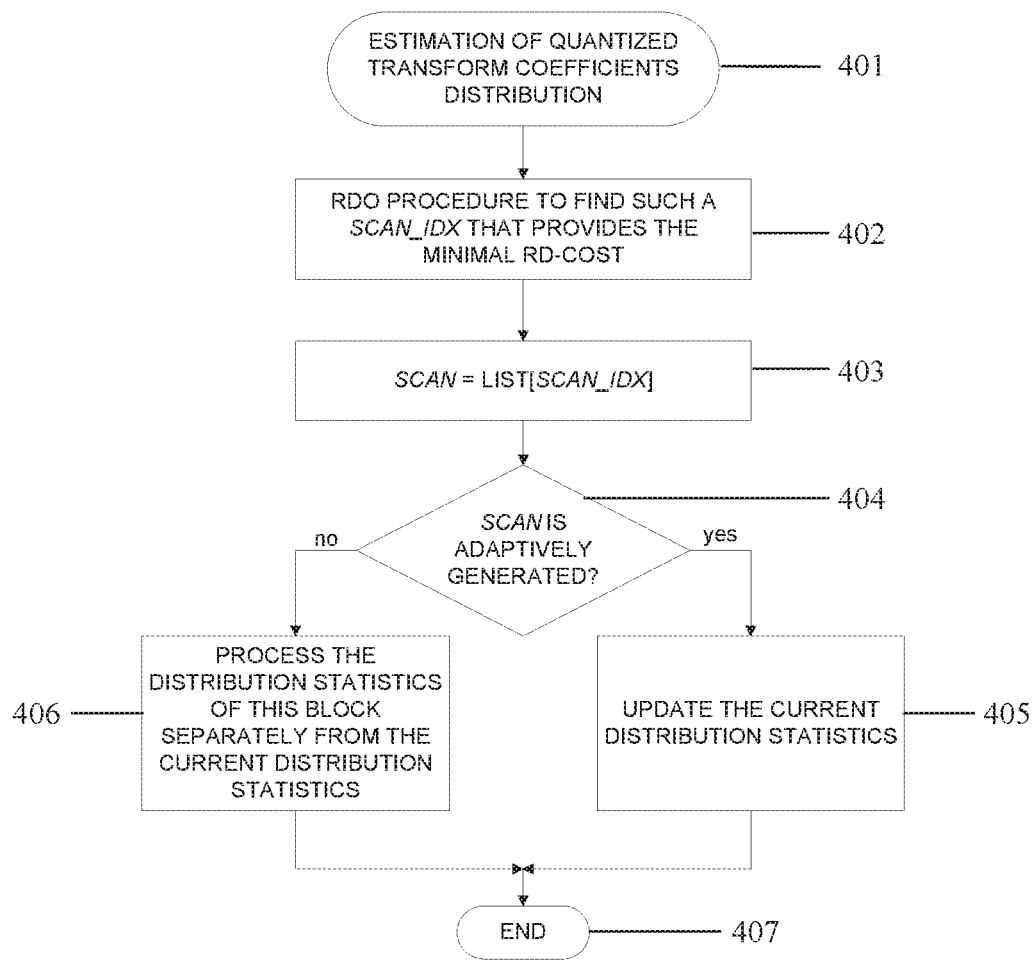
FIG. 4 shows a flowchart of coefficient distribution estimation at the video encoder according to an embodiment of the present disclosure.

FIG. 4 shows a flowchart of distribution statistics estimation at the video encoder according to an embodiment of the present disclosure.

At the video encoder, the estimation 401 of the distribution statistics by the coefficient distribution estimator 113 comprises several steps.

In a step 402, an RDO procedure is carried out by the scan order selector 109 in order to select, from among the pre-defined scan orders provided by the scan pattern list module 110 and the generated scan orders provided by the scan order generator 111, the scan order that provides the minimal rate-distortion (RD) cost. In this step, the scan order information SCAN_IDX of the selected scan order is obtained.

In a step 403, the scan order corresponding to the selected scan order information SCAN_IDX is obtained.

The further steps 404 to 407 correspond to the steps 305 to 308 of FIG. 3.

As shown in FIGS. 3 and 4, at both the encoder and the decoder sides a scan order list is initialized. It includes members of the scan pattern list module and scan orders generated by the scan order generator. Depending on whether the scan order selected by the scan order selector is generated or pre-defined, a decision on the distribution statistics is taken. This decision may consist in updating the current distribution statistics or not, or in resetting the current distribution statistics.

Figure 5:
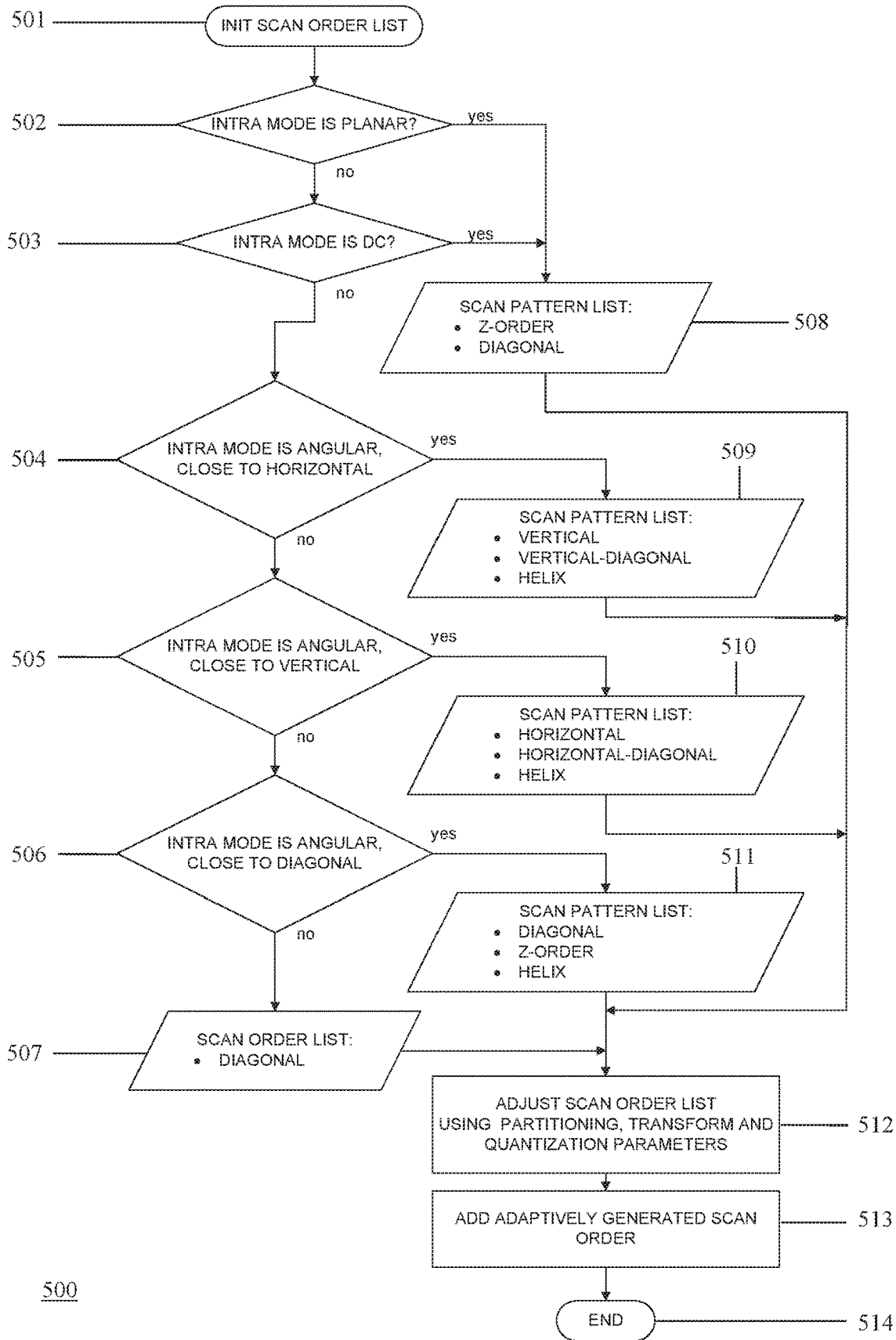
FIG. 5 shows a flowchart of an initialization of a scan order list according to an embodiment of the present disclosure.

One of the possible ways to initialize the scan order list is shown in FIG. 5. FIG. 5 correspondingly shows a flowchart 500 of an initialization 501 of a scan order list according to an embodiment of the present disclosure.

Its initialization depends on prediction mode, partitioning mode, transform parameters and quantization parameters specified for a block being processed.

In a step 502, it is determined whether the prediction mode of that block is a planar intra prediction mode. If this is true, a scan pattern list of pre-defined scan orders is defined 508 so as to comprise pre-defined Z-order and diagonal scan orders. If this is false, step 503 is carried out.

In the step 503, it is determined whether the prediction mode of that block is a DC intra prediction mode. If this is true, a scan pattern list of pre-defined scan orders is defined 508 so as to comprise pre-defined Z-order and diagonal scan orders. If this is false, step 504 is carried out.

In the step 504, it is determined whether the prediction mode of that block is an angular intra prediction mode close to horizontal. If this is true, a scan pattern list of pre-defined scan orders is defined 509 so as to comprise vertical, vertical-diagonal, and helix scan orders. If this is false, step 505 is carried out.

In the step 505, it is determined whether the prediction mode of that block is an angular intra prediction mode close to vertical. If this is true, a scan pattern list of pre-defined scan orders is defined 510 so as to comprise horizontal, horizontal-diagonal, and helix scan orders. If this is false, step 506 is carried out.

In the step 506, it is determined whether the prediction mode of that block is an angular intra prediction mode close to diagonal. If this is true, a scan pattern list of pre-defined scan orders is defined 511 so as to comprise diagonal, Z-order, and helix scan orders. If this is false, step 507 is carried out. In the step 507, a scan pattern list of pre-defined scan orders is defined so as to comprise a diagonal scan order.

After defining the scan order list of pre-defined scan orders for that block, the scan order list is adjusted 512 using the portioning mode, the transform parameters and quantization parameters of that block.

In a step 513, the one or more generated scan orders provided by the scan order generator are added to the pre-defined scan orders, so that for example the scan order selector 109 of the encoder may select from the pre-defined and generated scan orders, the scan order that provides the minimal RD cost.

As shown in FIG. 5, the pre-defined scan orders may depend on the prediction mode and/or partitioning mode and/or transform parameters and/or quantization parameters. For example, the most probable scan orders for the cases of DC or planar intra modes are Z-order and diagonal scan order. For angular modes, the directionality of the residual signal may be taken into account so that the pre-defined scan orders may be selected to be orthogonal to the intra-mode directionality.

Afterwards this list of pre-defined scan orders may be updated according to other encoding parameters, such as the portioning mode, the transform parameters and quantization parameters. Particularly, this list may be updated according to partitioning and transform sizes.

For example, in the inter-prediction mode, non-square prediction modes can also indicate the directional nature of the residual signal and the list of pre-defined scan orders may be updated accordingly: if a partitioning rectangle is oriented vertically then horizontal and horizontal-diagonal scan orders are added to the scan list. The list of pre-defined scan orders is updated accordingly for horizontally oriented partitioning: in such a case, vertical and vertical-diagonal scans are added to the list of pre-defined scan orders.

For example, this list of pre-defined scan orders may be updated according to transform sizes. Smaller TU sizes introduce restrictions on some scan patterns. Then, for example helix scans may be excluded from the pre-defined scan order list if TU size is smaller than 8×8 pixels.

Quantization parameters (QP) may affect both the list of pre-defined scan orders and the signaling method. For high QP values, the number of scan patterns may be reduced. For example, helix scans may be skipped for all the TU sizes, because QTCs become more aligned to left, top and upper-left corner of QTCs matrix.

Figure 6:
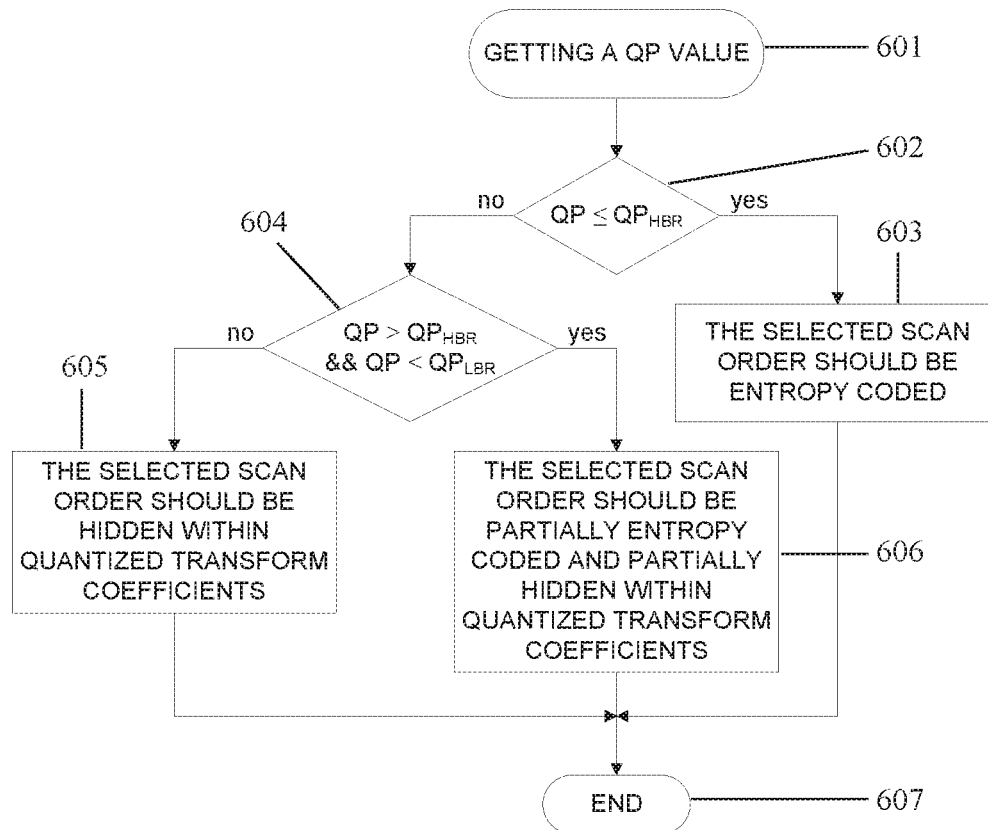
FIG. 6 shows a flowchart of implicit and explicit signaling of selected scan order according to an embodiment of the present disclosure.

An example of the dependency of the signaling scheme on QP is shown in FIG. 6. FIG. 6 particularly shows a flowchart 600 of implicit and explicit signaling of selected scan order according to an embodiment of the present disclosure.

In a first step 601, a QP value is obtained. If that QP value is smaller or equal 602 to a QP value for high bit rates $QP_{HBR}$, then the scan order information SCAN_IDX should be entropy coded 603 in the bitstream.

If the QP value is above the value $QP_{HBR}$ and below a further QP value for low bit rates $QP_{LBR}$, then the scan order information SCAN_IDX should be partially entropy coded 606 and partially hidden within the quantized transform coefficients by the hiding module 112.

If the QP value is above the value $QP_{HBR}$ and above or equal to that further QP value for low bit rates $QP_{LBR}$, then the scan order information SCAN_IDX should be hidden 605 within the quantized transform coefficients by the hiding module 112.

Accordingly, hiding becomes more costly with the increase of bitrate and is totally switched off for high bit rates. For low bit rates vice versa, hiding becomes more preferable. Otherwise, i.e. for middle bit rates, both signaling mechanisms are being used. The selection of the signaling mechanism is performed for each block or TU depending on whether hiding can be performed for it.

According to the present disclosure, a decoder 200 for decoding coefficients of blocks of a video sequence from a bitstream 207 is proposed. The decoder comprises:
- a decoding module 206 configured to decode one or more coefficient vectors of each block from the bitstream 207,
- a check module 212 configured to reconstruct, for at least one block, hidden information from one or more coefficients of that block, the hidden information constituting or forming part of scan order information SCAN_IDX associated with that block,
- a scan order selector 209 configured to select a scan order for each block from a set of scan orders, preferably from a set of pre-defined and generated scan orders, on the basis of the scan order information SCAN_IDX associated with that block,
- a deserializer 204 configured to inverse scan, for each block, the one or more coefficient vectors of that block according to the scan order selected for that block so as to obtain a coefficient matrix.

According to the present disclosure, a corresponding encoder 100 for encoding coefficients of blocks of a video sequence into a bitstream 107 is proposed, the coefficients of each block being contained in a respective coefficient matrix. The encoder comprises:
- a scan order selector 109 configured to select a scan order for each block from a set of scan orders, preferably from a set of pre-defined and generated scan orders,
- a serializer 104 configured to scan, for each block, the coefficient matrix of that block according to the scan order selected for that block so as to obtain one or more coefficient vectors,
- a hiding module 112 configured to hide, for at least one block, scan order information SCAN_IDX identifying the scan order selected for that block at least partially in one or more coefficients of that block,
- a coding module 106 configured to code the coefficient vectors into the bitstream 107.

The coding efficiency may then be improved because the signaling overhead in the bitstream 107, 207 generated by the encoder and received by the decoder may be reduced.

Preferably, the check module 212 is configured to reconstruct, for at least one block, the hidden information from at least one hiding coefficient vector chosen from among the one or more coefficient vectors obtained for that block. Also, the hiding module 112 is configured to hide, for at least one block, the scan order information SCAN_IDX in at least one hiding coefficient vector chosen from among the one or more coefficient vectors obtained for that block.

The reconstruction and the hiding may depend on a hiding condition. Such a hiding condition comprises a comparison of a parameter depending on the hiding coefficient vector to a threshold.

The parameter may be:
- a number of significant, i.e. non-zero, coefficients within the hiding coefficient vector, or
- a distance between first and last significant coefficients within the hiding coefficient vector, or
- a ratio of a maximum absolute value to a minimum absolute non-zero value of the coefficients within the hiding coefficient vector, wherein the hiding condition is true if the parameter is above the threshold, and false if the parameter is below the threshold.

Figure 7:
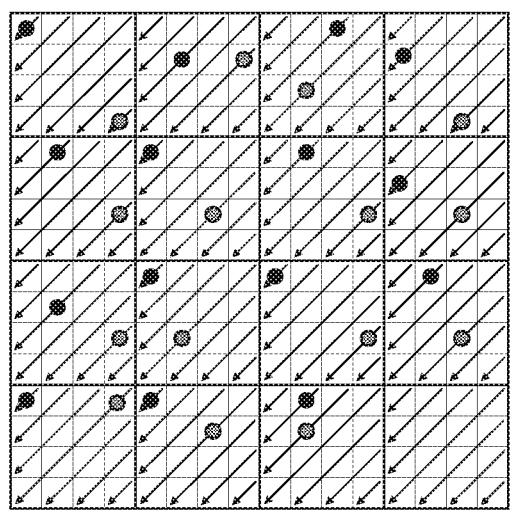

FIGS. 7 and 8 show a hiding condition according to an embodiment of the present disclosure. Particularly, FIG. 7 shows a block or TU which is subdivided into coefficient groups (CGs), each coefficient vector corresponding to a coefficient group. FIG. 8 shows an example of coefficient vector illustrating the case that the parameter consists in the distance N between first and last significant, i.e. non-zero, coefficients within the coefficient vector. If the value N is above a threshold TSIG, then the hiding condition is true and scan order information may be hidden in that coefficient vector.

Particularly, the check module 212 may be configured to reconstruct the hidden information from the hiding coefficient vector by applying a check-function to the hiding coefficient vector, a result of the check-function being the hidden information. Also, the hiding module 112 is configured to hide, for at least one block, the scan order information SCAN_IDX in the hiding coefficient vector by:
- applying a check-function to the hiding coefficient vector so as to obtain a result of the check-function,
- determining whether the result of the check-function corresponds to the scan order information SCAN_IDX,
- if not, modifying the hiding coefficient vector so that the result of the check-function corresponds to the scan order information SCAN_IDX.

It is proposed that the result of the check-function depends on coordinates (x, y), within the coefficient matrix, of the last significant coefficient of the hiding coefficient vector. The check-function may be e.g. the following function:

$$\mathrm{mod}(x+y+R, 2)$$

x and y being the coordinates, and R being an integer value.

For example, the check-function may also be one of the following functions or other known check-functions:
- a parity check-function applied to the least significant bits of some coefficient selected from the coefficient matrix using a binary pattern, and
- a parity check-function applied to a position index of the last or first non-zero coefficient or to a linear combination of last and first non-zero coefficient position index.

In this respect, FIG. 9 shows an entropy decoding 901 of coefficients according to the prior art, and particularly according to the H.265 video coding standard. The entropy decoding 901 comprises decoding 902 X and Y coordinates of the last significant, i.e., non-zero, QTC. Then, a mask of QTCs significance values (significance mask) is signaled 903 according to a scan order, starting from the last significant QTC. Values and signs are parsed 904, 905 from the bitstream only for significant coefficient values.

Hence, a length of the 1D significance mask can be derived from the scan order and coordinates of the last significant QTC. Obviously, it is not sufficient just to apply known data hiding methods to embed scan order indication data into QTCs, because QTCs are parsed from the bitstream using scan order information.

Figure 10:
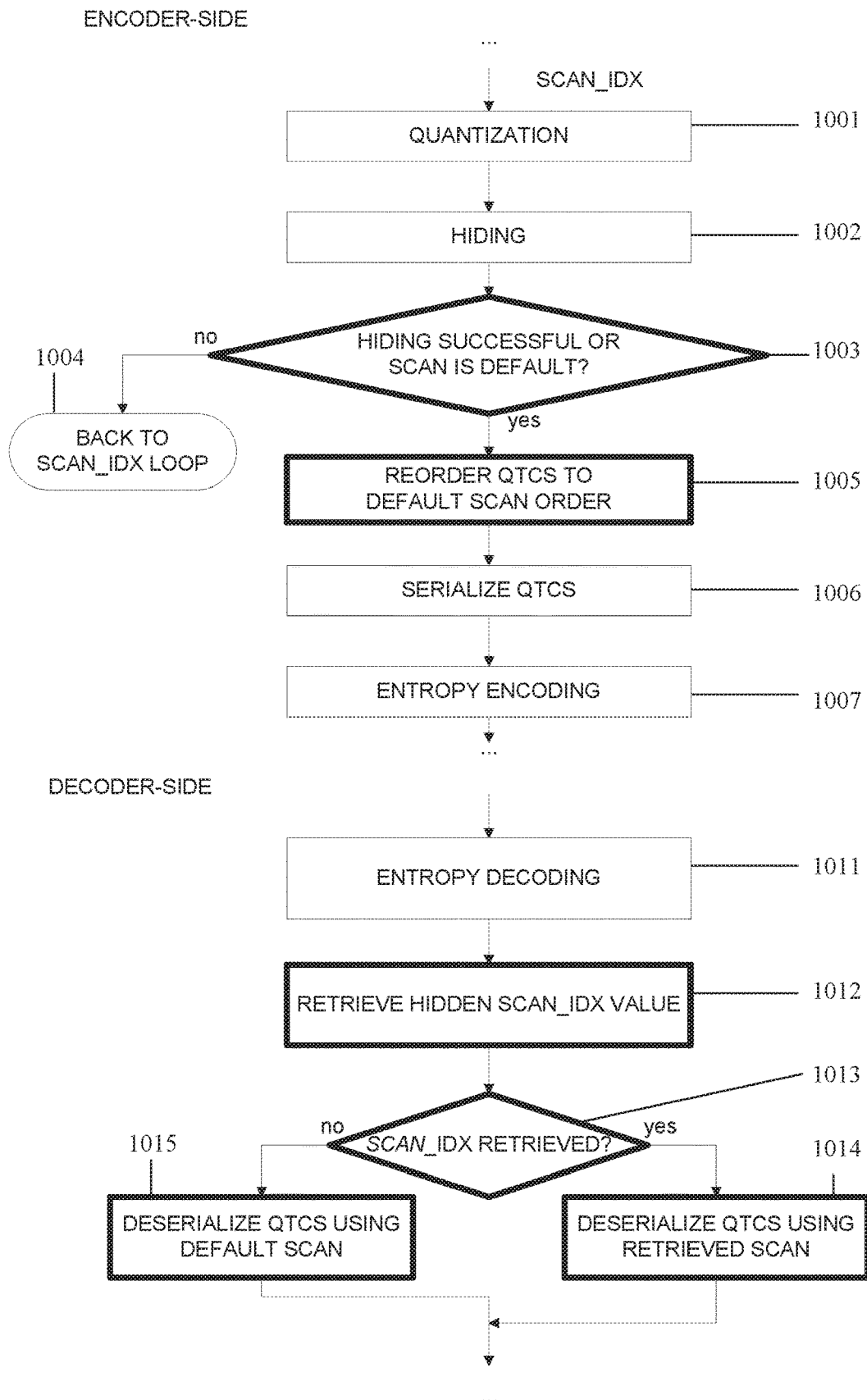
FIG. 10 shows an embodiment of the present disclosure for improving the coding efficiency by reducing the signaling overhead in the bitstream.

FIG. 10 shows an embodiment of the present disclosure, and particularly an embodiment for improving the coding efficiency by reducing the signaling overhead in the bitstream 107, 207 generated by the encoder and received by the decoder.

In the embodiment of FIG. 10, a scan order hiding within QTCs is possible. During encoding process, several different scan orders—indexed by SCAN_IDX—are applied during quantization 1001 and hiding 1002 stages. Quantization procedure 1001 may use scan information to estimate the number of bits (i.e. bit rate) to encode QTC values and to perform rate-distortion optimization by adjusting these QTC values with respect to the estimated bit rate.

If the hiding has not been successful 1003, i.e. for example if the hiding condition is false, then another scan order SCAN_IDX is selected 1004. Preferably another scan order is selected until hiding is successful. If the selected scan is a default scan order, for example no hiding is performed.

If hiding is successful or the selected scan order is the default on, then it is possible to reorder 1005 the QTCs according to default scan order. The next steps comprise serializing 1006 the QTCs and entropy encoding 1007. Said steps 1006 and 1007 may correspond to blocks 104 and 106 of FIG. 1. The serialization 1006 can also be inserted between 1001 and 1002 as it is the case in FIG. 1.

Hiding 1002 comprises checking the hiding condition, and also modifying QTCs so that the hiding condition is met. This modification may include: altering QTCs values, setting QTCs values to zero and making insignificant (zero-valued) QTCs to be significant ones (non-zero). Obviously, it is always possible to adjust QTCs so that hiding condition is met. However, the QTCs adjustments at the encoder side is constrained by the distortion incurred by these adjustments, and reasonable adjustment constraints are applied. For example, because of quantization procedure a reasonable coefficient adjustment is plus or minus one. This constraint makes it possible that hiding operation may not be performed, i.e. there was no possible adjustments of QTCs to meet hiding condition (1003 evaluates to "no" case for non-default scans).

At the decoder side, after entropy decoding 1011, hidden information is retrieved 1012 from serialized data, and therefore hiding stage also requires information on scan order that will be used at the decoder side so that it can be embedded with respect to the selected scan order. Data hiding procedure can also be performed jointly with quantization, like it is done e.g. for Sign Bit Hiding. However, hiding may fail for some of QTCs, because hiding condition is not met. For example, TU has a number of significant QTCs that is lower than a threshold. In this case further processing depends on whether a scan order is the default one. If default scan was used, decoder can derive it 1015 by applying the same hiding condition to parsed QTCs during entropy decoding stage. Otherwise, scan order is skipped and next scan order is being checked if available.

If default scan order is in effect, reordering QTCs stage can be skipped, because the source and the target scans are the same ones. For non-default scan orders it is proposed to perform coefficients reorder, so that entropy encoding and entropy decoding stages can be performed without changes. A particular implementation may use remapping operation to avoid unnecessary copy operation for reordering, i.e. by redefining a match between coordinates of 2D QTC matrix and 1D position within a selected scan. At serialization/deserialization stage this remapping can provide CABAC context indices and last significant QTC coordinates for the given 1D scan position as if the QTCs were reordered.

Figure 11:
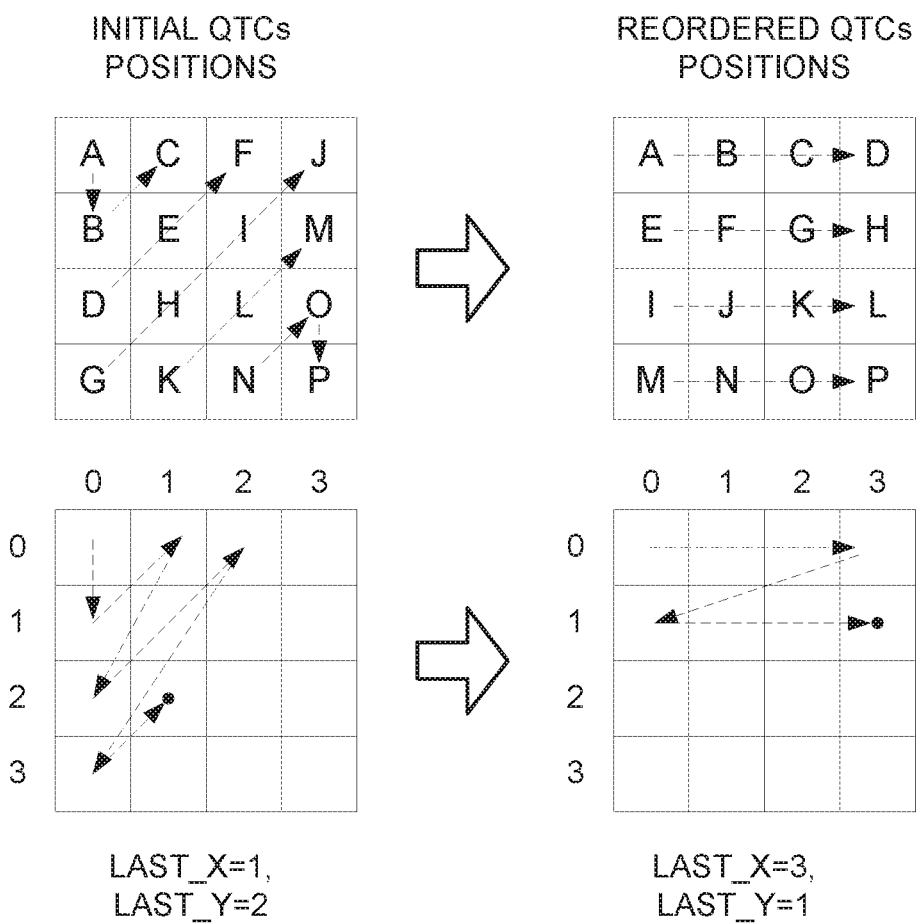
FIG. 11 shows a coefficient reorder according to the present disclosure.

FIG. 11 shows a coefficient reorder according to the present disclosure, and particularly shows an example of QTCs reorder for a 4×4 block: reordering from diagonal to horizontal scan.

In this respect, it is referred to the document "Transform Coefficient Coding in HEVC" by Joel Sole et al., IEEE TRANSACTIONS ON CIRCUITS AND SYSTEMS FOR VIDEO TECHNOLOGY, VOL. 22, NO. 12, DECEMBER 2012, pages 1765-1777. In Section V.B of this document, it is stated that a significance flag is coded using a context model for each coefficient between the last one in scanning order (which is excluded) and the DC coefficient. For a 4×4 transform block TB, i.e. matrix of QTCs, the context depends on the position of the coefficient within the TB, as in H.264/AVC. Despite the fact that entropy encoding is performed for serialized and binarized data, context model for encoding a significance bit of a QTC is selected depending on the position of this QTC within a matrix of QTCs, and significance of spatially neighboring QTCs (right and lower). The state-of-the-art decoder parses significance bit from the bitstream using context model, that is selected according to the position of QTC for which this bit is being parsed and the positions of previously decoded significant QTCs. If the scan order is unavailable to the decoder, spatial position of QTC is undefined and hence, context model cannot be derived.

The proposed reordering stage, as shown e.g. in FIG. 11, before entropy encoder, ensures that encoder and decoder will use the same scan order and the same context models for the encoded/decoded QTCs.

FIG. 11 particularly describes a case when, after quantization, a matrix of QTCs was obtained (left-bottom part of it) with the last significant coefficient (for diagonal scan) located at (x=1,y=2). In case of diagonal scan 8 coefficient significance bits should be encoded.

In order to select another scan order (e.g. by selector 109), e.g., horizontal scan instead of diagonal one, it may be beneficial to encode first two rows of QTCs bits plus two QTC bits of the third row (10 QTCs total). However, if these coefficient are reordered from diagonal scan to horizontal one (as shown in the upper part of FIG. 11), the position of the last the same 8 QTC bits should be encoded.

For the entropy coding module 106, two scans are available:
 default one, that would be used by entropy decoding module 206 to parse the bitstream
 the scan selected by scan order selector 109.

When the entropy coding module selects a context model according to QTCs position, it uses not just X,Y defined by scan order selector 109, but recalculate X,Y for the corresponding position of QTC after it is reordered.

For example, in the example of FIG. 11, it is proposed to consider a case when scan order selector 109 has selected diagonal scan and the default scan is horizontal one. Entropy coding module 106 will encode coefficient placed at position (x=1, y=1) (marked as "E" for diagonal scan) with use context module of reordered position (x0, y=2) (also marked as "E" for horizontal scan), as well as neighboring coefficients will be defined not as "I" and "H", but as "F" and "I".

This reordering operation can be implemented as a remap of X and Y coordinates from a selected scan to the default one, i.e. to implement this reorder it is not necessary to perform a memory copy/swap operations for QTCs but just to provide a look-up table for x an y coordinates for each of (selected scan, default scan) pair.

Data hiding may use known methods to embed scan order into QTCs. However, in the present case of hiding the scan order, a further possibility consists in that a scan order may be specified by a condition applied to coordinates of the last significant QTC value (x, y), e.g:

$$\mod(x+y,2)=\text{scan\_idx} \qquad (C1)$$

In this case encoder may modify position of the last significant QTC in order to indicate a scan that should be used by decoder. The hiding condition for the described hiding method is a set of coordinates specified for a scan order. In this respect, FIG. 12 shows an example of hiding conditions defined for scan orders.

Figure 12:
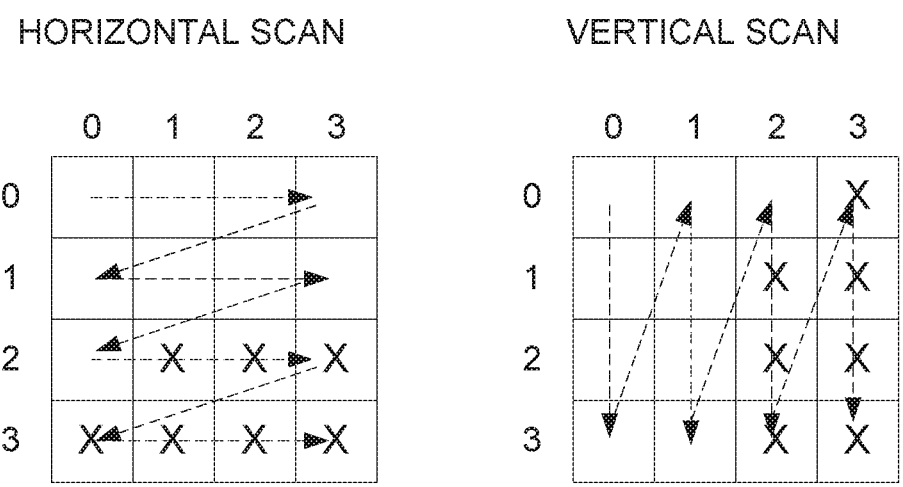
FIG. 12 shows an example of hiding conditions defined for scan orders.

In FIG. 12, "X" marks indicate positions that are checked using condition (C1). It is also possible to combine this approach with data hiding within QTC values. For example, value retrieved from last significant QTC position may be used as a part of hiding condition for hiding within QTCs values.

It is known that hiding is more efficient if host and target signals have a universal distribution. Another embodiment of this disclosure is the possibility to make the distribution of (C1) closer to universal by randomization. Specifically, an additional source of random noise R can be added:

$$\mod(x+y+R,2)=\text{scan\_idx}$$

The value of R should be as uncorrelated to selected scan order as possible. For example, it may be a number of neighbor TUs, a parity value of a sum of reference sample values, or a total number of encoded bits.

So, the disclosure proposes, to reduce the signaling overhead, to derive a scan order before QTCs deserialization, during entropy decoding. When hiding TU-related data (such as intra-prediction mode, filtering flag, etc.) the information being hidden is utilized after deserialization and dequantization stages. The disclosure proposes thus a possibility to use data hidden in QTCs before these coefficients are deserialized.

The present disclosure describes a quantization procedure that is applicable to the residues obtained after prediction and transform processes used e.g. for moving pictures coding. The goal of the present disclosure is to improve the rate-distortion efficiency of quantization by extending the set of available scan orders selected using different coding features (e.g., intra-prediction mode, block size, partitioning mode) at the TU level. A particular implementation of this disclosure is presented as a technique that simultaneously uses mechanisms of mode-dependent and RDO-based scan selection.

The present disclosure solves problems related to the RDO-based selection of scan orders. Particularly, it solves the problem that adaptive scan orders based on gathered statistics of previously encoded or decoded blocks do not always provide a better coding efficiency with respect to known pre-defined scan patterns. So, an RDO-based procedure for selecting just one scan among the content-adaptive generated scan orders and the pre-defined scan patterns is proposed as a solution.

Particularly, the present disclosure solves the above-mentioned problem of increasing the coding efficiency of scan order selection in that both pre-defined scan patterns and adaptively generated scan orders are available.

The present disclosure in its multimedia coding embodiments further on provides the advantage that it can be used in many potential applications in hybrid video coding framework that are compatible with Joint Exploration Model (JEM) that is the foundation for a next-generation video coding standard. A further advantage is the reduced BD-rate (Bjøntegaard Delta Rate) and subjective quality improvements in comparison with JEM1. A further advantage is that a computationally complex Adaptive Multiple Transform (AMT) also known as Enhanced Multiple Transform (EMT) may be replaced by a simpler adaptive scan order selection procedure.

An aspect of the present disclosure is the combination of pre-defined scan patterns or orders with adaptively generated scan orders. Moreover, adding a signaling mechanism for a scan order selection procedure allows to significantly improve the process of generating adaptive scan orders for increasing its coding efficiency.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A decoder comprising:
a non-transitory computer-readable medium carrying a computer program comprising a program code; and
one or more processors configured to execute the program code to:
decode one or more coefficient vectors from a bitstream representing a sequence of video frames, wherein each video frame is associated with one or more blocks, and wherein each coefficient vector of the one or more coefficient vectors corresponds to a block associated with a video frame from the sequence of video frames,
reconstruct, for at least one block, hidden information from the coefficient vector corresponding to the at least one block, wherein the hidden information comprises a portion of scan order information associated with the at least one block,
select, for each block, a scan order for the block from a set of scan orders based on the scan order information associated with the at least one block, and
inverse scan, for each block, the one or more coefficient vectors according to the scan order selected for the block to obtain a coefficient matrix for the block.

2. The decoder according to claim 1, wherein reconstructing, for the at least one block, the hidden information comprises:
reconstructing, for the at least one block, the hidden information from a hiding coefficient vector chosen from among the one or more coefficient vectors obtained for the at least one block.

3. The decoder according to claim 1, wherein reconstructing, for the at least one block, the hidden information comprises:
reconstructing, for at least one block, the hidden information from a hiding coefficient vector depending on a hiding condition, wherein the hiding condition is based on a comparison of a parameter depending on the hiding coefficient vector to a threshold.

4. The decoder according to claim 3, wherein the parameter is:
a number of significant coefficients within the hiding coefficient vector, or
a distance between first and last significant coefficients within the hiding coefficient vector, or
a ratio of a maximum absolute value to a minimum absolute non-zero value of the coefficients within the hiding coefficient vector,
wherein the hiding condition is true if the parameter is above the threshold, and false if the parameter is below the threshold.

5. The decoder according to claim 3, wherein the one or more processors are further configured to execute the program code to:
check the hiding condition, and
reconstruct the hidden information from the hiding coefficient vector if the hiding condition is true.

6. The decoder according to claim 3, wherein, if the hiding condition is false, selecting, for each block, the scan order comprises selecting a pre-defined default scan order.

7. The decoder according to claim 2, wherein reconstructing, for the at least one block, the hidden information comprises:
reconstructing, for the at least one block, the hidden information from the hiding coefficient vector by applying a check-function to the hiding coefficient vector, wherein a result of applying the check-function comprises the hidden information.

8. The decoder according to claim 7, wherein the result of applying the check-function depends on coordinates (x, y) within the coefficient matrix of a last significant coefficient of the hiding coefficient vector, wherein the check-function comprises the following function:

$$\mathrm{mod}(x+y+R,2)$$

wherein x and y are coordinates of the coefficient matrix and R is an integer value.

9. The decoder according to claim 1, wherein the one or more processors are further configured to execute the program code to:
reconstruct, for a first block, hidden information from the coefficient vector corresponding to the first block, wherein the hidden information comprises a portion of scan order information associated with the first block, and
select, for the first and at least a second block, a scan order that is based on the scan order information associated with the first block.

10. A method for decoding coefficients of blocks, the method comprising:
decoding one or more coefficient vectors from a bitstream representing a sequence of video frames, wherein each video frame is associated with one or more blocks, and wherein each coefficient vector of the one or more coefficient vectors corresponds to a block associated with a video frame from the sequence of video frames,
reconstructing, for at least one block, hidden information from the one or more coefficient vector corresponding to the at least one block, wherein the hidden information comprises a portion of scan order information associated with the at least one block,
selecting, for each block, a scan order for the block from a set of scan orders based on the scan order information associated with the at least one block, and
obtaining a coefficient matrix by inverse scanning, for each block, the one or more coefficient vectors according to the scan order selected for the block.

11. An encoder for encoding coefficients of blocks, the encoder comprising:
a non-transitory computer-readable medium carrying a computer program comprising a program code; and
one or more processors configured to execute the program code to:
select, for each block, a scan order for the block from a set of scan orders, wherein each block corresponds to a respective coefficient matrix,
scan, for each block, the coefficient matrix corresponding to the block according to the scan order selected for the block to obtain a coefficient vector corresponding to the block,
hide, for at least one block, scan order information identifying the scan order selected for the at least one block at least partially in the coefficient vector corresponding to the at least one block,
code, for each block, the coefficient vector corresponding to the block into a bitstream representing a sequence of video frames, wherein each video frame is associated with one or more blocks, and wherein each coefficient vector of the one or more coefficient vectors corresponds to a block associated with a video frame from the sequence of video frames.

12. The encoder according to claim 11, wherein hiding, for the at least one block, the scan order information comprises:
hiding, for the at least one block, the scan order information in a hiding coefficient vector chosen from among the coefficient vector corresponding to the at least one block.

13. The encoder according to claim 12, wherein hiding, for the at least one block, the scan order information in the hiding coefficient vector is based on a hiding condition, wherein the hiding condition is based on a comparison of a parameter depending on the hiding coefficient vector to a threshold.

14. The encoder according to claim 13, wherein the parameter is:
a number of significant coefficients within the hiding coefficient vector, or
a distance between first and last significant coefficients within the hiding coefficient vector, or
a ratio of a maximum absolute value to a minimum absolute non-zero value of the coefficients within the hiding coefficient vector,
wherein the hiding condition is true if the parameter is above the threshold, and false if the parameter is below the threshold.

15. The encoder according to claim 13, wherein the one or more processors are further configured to execute the program code to:
check the hiding condition, and
hide the scan order information in the hiding coefficient vector if the hiding condition is true.

16. The encoder according to claim 13,
wherein, if the hiding condition is false, the one or more processors are further configured to execute the program code to recursively, select another scan order from the set of scan orders until the hiding condition for that other selected scan order is true.

17. The encoder according to claim 13,
wherein, if the hiding condition is false, selecting, for each block, the scan order comprises selecting a pre-defined default scan order.

18. The encoder according to claim 12, wherein hiding, for the at least one block, the scan order information in the hiding coefficient vector comprises:
applying a check-function to the hiding coefficient vector to obtain a result of applying the check-function, and
determining whether the result of applying the check-function corresponds to the scan order information, and if not, modify the hiding coefficient vector so that the result of applying the check-function corresponds to the scan order information.

19. The encoder according to claim 18, wherein the result of applying the check-function depends on coordinates (x, y) within the coefficient matrix of a last significant coefficient of the hiding coefficient vector, wherein the check-function comprises the following function:

$$\mod(x+y+R,2)$$

wherein x and y are coordinates of the coefficient matrix and R is an integer value.

20. The encoder according to claim 11, wherein, if an identical scan order is selected for a first block and at least a second block, the one or more processors are further configured to execute the program code to:
hide scan order information identifying the identical scan order in one or more coefficients of the first block.

21. The decoder according to claim 1, wherein the one or more processors are further configured to execute the program code to:
obtain one or more pre-defined scan orders,
generate one or more generated scan orders, and
select, for each block, the scan order for the block from the one or more pre-defined scan orders and the one or more generated scan orders based on the scan order information for the block contained in the bitstream,
wherein generating the one or more generated scan orders depends on one or more previously obtained coefficient matrices of blocks.

22. The decoder according to claim 21, wherein the one or more pre-defined scan orders are obtained for each of a plurality of coding parameter sets, wherein the one or more processors are further configured to execute the program code to:
generate, for each coding parameter set, a scan order for the coding parameter set depending on one or more previously obtained coefficient matrices associated with the coding parameter set,
wherein selecting, for each block, the scan order for the block comprises:
determining a coding parameter set of the block, and
selecting the scan order for the coefficient matrix obtained for the block from the one or more pre-defined scan orders and the one or more generated scan orders for the determined coding parameter set of the block.

23. The decoder according to claim 22, wherein the one or more processors are further configured to execute the program code to:
obtain, for each of the plurality of coding parameter sets, distribution statistics of one or more previously obtained coefficient matrices associated with the coding parameter set, and
generate, for each coding parameter set, the scan order for the coding parameter set depending on the distribution statistics for the coding parameter set.

24. The decoder according to claim 23,
wherein, if the scan order selected for a given block is a pre-defined scan order, then the one or more processors are further configured to execute the program code not to update or to reset the distribution statistics for the coding parameter set of the given block.

25. The decoder according to claim 22, wherein the one or more processors are further configured to execute the program code to:
parse, for each block, coding parameter information from the bitstream, and
determine the coding parameter set of a given block according to the parsed coding parameter information for the given block.

26. The decoder according to claim 21, wherein the one or more processors are further configured to execute the program code to:
parse the scan order information identifying the selected scan order from the bitstream.

27. The method according to claim 10, further comprising:
obtaining one or more pre-defined scan orders,
generating one or more generated scan orders, and
selecting, for each block, the scan order for the block from the one or more pre-defined scan orders and the one or more generated scan orders based on the scan order information for the block contained in the bitstream,
wherein generating one or more generated scan orders depends on one or more previously obtained coefficient matrices of blocks.

28. The encoder according to claim 11, wherein the one or more processors are further configured to execute the program code to:
obtain one or more pre-defined scan orders,
generate one or more generated scan orders, and
select, for each block, the scan order for the block from the one or more pre-defined scan orders and the one or more generated scan orders,
wherein generating the one or more generated scan orders depends on one or more previously scanned coefficient matrices of blocks.

29. The encoder according to claim 28, wherein the one or more pre-defined scan orders are obtained for each of a plurality of coding parameter sets, wherein the one or more processors are further configured to execute the program code to:
generate, for each coding parameter set, a scan order for the coding parameter set depending on one or more previously obtained coefficient matrices associated with the coding parameter set,
wherein selecting, for each block, the scan order for the block comprises:
determining a coding parameter set of the block, and
selecting the scan order for the coefficient matrix obtained for the block from the one or more pre-defined scan orders and the one or more generated scan orders for the determined coding parameter set of the block.

30. The encoder according to claim 29, wherein the one or more processors are further configured to execute the program code to:
obtain, for each of the plurality of coding parameter sets, distribution statistics of one or more previously obtained coefficient matrices associated with the coding parameter set, and generate, for each coding parameter set, the scan order for the coding parameter set depending on the distribution statistics for the coding parameter set.

31. The encoder according to claim 30,
wherein, if the scan order selected for a given block is a pre-defined scan order, then the one or more processors are further configured to execute the program code not to update or to reset the distribution statistics for the coding parameter set of the given block.

32. The encoder according to claim 28, wherein the one or more processors are further configured to execute the program code to:
add scan order information identifying the selected scan order in the bitstream.

33. The encoder according to claim 28, wherein selecting, for each block, the scan order from the one or more pre-defined scan orders and the one or more generated scan orders is based on a cost function.

34. A non-transitory computer-readable medium carrying a computer program comprising a program code for performing the method according to claim 10, when the computer program runs on a computing device.

35. The decoder according to claim 1, wherein the set of scan orders comprises a set of pre-defined scan orders and generated scan orders.

36. The encoder according to claim 11, wherein the set of scan orders comprises a set of pre-defined scan orders and generated scan orders.

37. The method according to claim 10, wherein the set of scan orders comprises a set of pre-defined scan orders and generated scan orders.

\* \* \* \* \*